(12) United States Patent
Tani et al.

(10) Patent No.: US 11,491,572 B2
(45) Date of Patent: Nov. 8, 2022

(54) SENSOR DEVICE FOR WELDING

(71) Applicants: DAIHEN CORPORATION, Osaka (JP); KYOCERA CORPORATION, Kyoto (JP)

(72) Inventors: Nobuhiro Tani, Osaka (JP); Hirokazu Saito, Osaka (JP); Kengo Onishi, Ome (JP); Tomohiro Noguchi, Ome (JP); Daisuke Kanai, Ome (JP)

(73) Assignees: DAIHEN CORPORATION, Osaka (JP); KYOCERA CORPORATION, Kyoto (JP)

( * ) Notice: Subject to any disclaimer, the term of this patent is extended or adjusted under 35 U.S.C. 154(b) by 466 days.

(21) Appl. No.: 16/494,180

(22) PCT Filed: Mar. 16, 2018

(86) PCT No.: PCT/JP2018/010484
§ 371 (c)(1),
(2) Date: Sep. 13, 2019

(87) PCT Pub. No.: WO2018/169057
PCT Pub. Date: Sep. 20, 2018

(65) Prior Publication Data
US 2020/0016676 A1    Jan. 16, 2020

(30) Foreign Application Priority Data

Mar. 17, 2017   (JP) .............................. JP2017-053081
Mar. 17, 2017   (JP) .............................. JP2017-053203

(51) Int. Cl.
*B23K 9/095*    (2006.01)
*B23K 9/32*     (2006.01)
(Continued)

(52) U.S. Cl.
CPC .............. *B23K 9/0956* (2013.01); *B23K 9/32* (2013.01); *B23K 31/12* (2013.01); *G01B 11/24* (2013.01); *G01D 11/245* (2013.01)

(58) Field of Classification Search
CPC ........ B23K 31/12; B23K 9/0956; B23K 9/32; B23K 9/325; G01B 11/00; G01B 11/24; G01D 11/245
(Continued)

(56) References Cited

U.S. PATENT DOCUMENTS 5,442,155 A * 8/1995 Nihei .................... B23K 9/0956
                                                  219/124.34
8,267,304 B2 * 9/2012 Pinchot ................. B01J 19/0093
                                                  228/252

(Continued)

FOREIGN PATENT DOCUMENTS

JP    2000-301339 A    10/2000
JP    2002-28786 A      1/2002
(Continued)

OTHER PUBLICATIONS

JP 2011245517.pdf (Year: 2011).*
(Continued)

*Primary Examiner* — Helena Kosanovic
*Assistant Examiner* — Ket D Dang
(74) *Attorney, Agent, or Firm* — Crowell & Morring LLP

(57) ABSTRACT

A sensor device includes a sensor to detect a light beam to measure states of work pieces or a distance to the work pieces, a case body housing the sensor, and a protective cover including a protective plate that transmits the detection light beam. The protective cover includes a gas flow channel that passes a gas to be blown to the protective plate, the gas flow channel having formed therein an outlet port that passes the detection light beam and discharges the gas (Continued)

having flowed through the gas flow channel. The gas flow channel includes an accumulator between the protective cover and the case body adapted to have accumulated therein the gas flowing through the gas flow channel, and the accumulator includes vent holes through which the gas is allowed to flow out toward the outlet port.

14 Claims, 14 Drawing Sheets

(51) Int. Cl.
  *B23K 31/12*  (2006.01)
  *G01B 11/24*  (2006.01)
  *G01D 11/24*  (2006.01)

(58) Field of Classification Search
  USPC .................. 219/130.01, 130.21, 124.34, 147

See application file for complete search history.

(56) References Cited

U.S. PATENT DOCUMENTS

2015/0239951 A1  10/2015  Boillot et al.
2015/0293351 A1  10/2015  Boillot et al.

FOREIGN PATENT DOCUMENTS

| JP | 2004-195502 A | | 7/2004 |
| JP | 2011-245517 A | | 12/2011 |
| JP | 16494180_2021-12-18_JP_2 | * | 12/2011 |
| JP | 2011245517 A | * | 12/2011 |
| KR | 2013-0012275 A | | 2/2013 |
| KR | 16494180_2021-12-18_KR_2 | * | 2/2013 |
| KR | 20130012275 A | * | 2/2013 |

OTHER PUBLICATIONS

KR 20130012275.pdf (Year: 2013).*
Office Action in China Application No. 201880017497.4, dated Nov. 18, 2020, 7 pages.
Extended European Search Report in Europe Application No. 18767667.1, dated Jan. 13, 2021, 4 pages.

* cited by examiner

SENSOR DEVICE FOR WELDING

This application is a 371 application of PCT/JP2018/010484 having an international filing date of Mar. 16, 2018, which claims priority to JP2017-053203 filed Mar. 17, 2017 and JP2017-053081 filed Mar. 17, 2017, the entire content of each of which is incorporated herein by reference.

TECHNICAL FIELD

The present invention relates to a sensor device for welding that is suitably used for welding work pieces together.

BACKGROUND ART

Conventionally, when a pair of iron plates with grooves are welded together through butt welding using arc welding, for example, a welding torch is brought close to the work pieces (i.e., to the portions with grooves that are butted together). In such a state, a voltage is applied across the tip end of a welding wire fed from the welding torch and the work pieces so that an arc is generated between them. Thus, the welding wire is melted and the work pieces are also heated and melted so that the work pieces can be welded together.

When welding is performed, the distance between the welding torch and the work pieces or the shapes of the work pieces will influence the quality of the work pieces to be welded together. In view of such a point, Patent Literature 1 proposes a sensor device for welding that measures the shapes of the work pieces or the distance to the work pieces, for example.

The sensor device for welding disclosed in Patent Literature 1 includes a laser beam projection unit that projects a laser beam, and a detection unit that detects a laser beam reflected from the surfaces of work pieces, and measures the shapes of the work pieces from the detected laser beam. The laser beam projection unit and the detection unit are housed within a case body. A protective cover has formed therein an outlet port so that a gas flows therethrough.

CITATION LIST

Patent Literature

Patent Literature 1: JP 2004-195502 A

SUMMARY OF INVENTION

Technical Problem

According to the sensor device of Patent Literature 1, as a gas is discharged from the outlet port, fume generated during welding can be prevented from entering the device. However, when a gas flowing through the sensor device pulsates, for example, it may be impossible to stably discharge the gas from the outlet port of the sensor device. When a flow of a gas discharged from the sensor device is unstable, there is a possibility that an excessive amount of fume may enter a path along which a detection light beam passes outside of the device, for example, with the result that the detection accuracy of the sensor device may vary.

The present invention has been made in view of the foregoing, and provides a sensor device for welding that has increased detection accuracy.

Solution to Problem

The inventors have conducted concentrated studies and found that when a gas flowing out through an outlet port is unstable, there is a possibility that an excessive amount of fume may enter a path, including the outlet port, along which a detection light beam passes, and thus, the detection accuracy of the sensor device may vary. Therefore, the inventors considered that providing an accumulator around the outlet port may be able to stabilize a gas flowing out through the outlet port and thus stabilize the state of the path along which a detection light beam passes.

The present invention has been made based on the new finding of the inventors. A sensor device for welding according to the present invention is a sensor device for welding, including a sensor unit including at least a detection unit configured to detect as a detection light beam a light beam from surfaces of work pieces to be welded together, the sensor unit being configured to measure states of the work pieces or a distance to the work pieces using the detection light beam detected with the detection unit; a case body adapted to house the sensor unit, the case body having formed therein at least one pass-through portion that passes the detection light beam directed toward the detection unit; and a protective cover including a protective plate that transmits the detection light beam, the protective cover being attached to the case body such that the protective plate covers the pass-through portion, in which the protective cover has formed therein a gas flow channel that passes a gas to be blown to the protective plate, the gas flow channel having formed therein an outlet port that passes the detection light beam and discharges a gas having flowed through the gas flow channel, the gas flow channel has formed therein an accumulator between the protective cover and the case body, the accumulator being adapted to have accumulated therein a gas flowing through the gas flow channel, and the accumulator has formed therein vent holes through which gases are allowed to flow out toward the outlet port.

According to the present invention, as the accumulator is formed, the pressure of a gas in the gas flow channel formed between the protective cover and the case body can be stabilized. Accordingly, since gases having flowed out through the vent holes can be discharged from the outlet port, which passes a detection light beam, by the accumulator at a stable pressure, variations in the measurement accuracy of the sensor unit can be suppressed. Since gases can be stably blown to the protective cover, sticking of foreign matter, such as dust, to the protective cover can be stably suppressed. It should be noted that "the states of work pieces" as referred to in the present invention include the shapes of the work pieces before or after they are welded together, the molten state of a welded portion (i.e., molten pool), which has been melted, formed on the work pieces, and the shape of the welded portion, for example.

Herein, the positions and number of the vent holes are not particularly limited as long as gases can be allowed to flow out through the vent holes toward the outlet port. However, as a more preferable configuration, the protective cover includes the protective plate and a holding member, the holding member being adapted to hold the protective plate, and the vent holes are formed on opposite sides of the accumulator, between the protective plate and the holding member.

According to such a configuration, as a pair of slits are provided on the opposite sides of the accumulator, gases can be uniformly blown to the protective plate from its opposite sides, and the blown gases can be stably discharged.

Herein, the shapes and number of the vent holes are not particularly limited as long as the aforementioned advantageous effects can be expected to be achieved. However, as a more preferable configuration, the vent holes are slits. When slits are formed as the vent holes, the slits can function as throttles for gas flows, and thus can maintain the pressure in the accumulator constant. Further, gases with increased flow velocities are discharged in band shapes from the slits.

Herein, the shape of the gas flow channel is not particularly limited as long as gases having passed through the slits are directed toward the protective plate. However, as a more preferable configuration, on the downstream side of the slits (i.e., on the side of the work pieces), a wall face of the gas flow channel that faces the slits has formed therein guide grooves, the guide grooves being adapted to guide gases having flowed out through the slits toward the protective plate.

According to such a configuration, gases having passed through the slits can be guided by the guide grooves to be blown to the protective plate from the side on which a laser beam is projected (i.e., on the side of the work pieces).

Herein, the shape of the accumulator is not particularly limited as long as gases can be allowed to stably flow out through the vent holes. However, as a more preferable configuration, the protective cover includes the protective plate and a holding member, the holding member being adapted to hold the protective plate, the gas flow channel has formed therein an introduction flow channel through which a gas is introduced into the accumulator, the accumulator includes a first accumulator between the holding member and the case body, and a second accumulator between the protective plate and the case body, the first accumulator being configured to have introduced thereinto a gas from the introduction flow channel, and the second accumulator being configured to allow the gas having flowed thereinto from the first accumulator to flow out through the vent holes, and a throttle portion is formed between the first accumulator and the second accumulator, the throttle portion being configured to throttle a flow rate of a gas to flow into the second accumulator from the first accumulator.

According to such a configuration, as the throttle portion is provided, a gas accumulated in the first accumulator can be allowed to flow into the second accumulator. Thus, the pressure in the second accumulator with the slits formed therein can be stabilized more. Consequently, stable gases can be flowed out through the slits.

In addition, the shape of the first accumulator is not particularly limited as long as the pressure of a gas to be directed toward the second accumulator can be stabilized in the first accumulator. However, as a more preferable configuration, the first accumulator has formed therein a pair of spaces extending along the introduction flow channel on opposite sides of the introduction flow channel. As a further preferable configuration, each space formed in the first accumulator has formed therein at least one partition wall that partitions the space along the introduction flow channel.

According to such a configuration, as a pair of spaces are formed along the introduction flow channel on the opposite sides thereof, a gas having flowed from the introduction flow channel can uniformly flow through the first accumulator, and thus, the pressure in the first accumulator can be stabilized more. In particular, since a partition wall that partitions each space is provided along the introduction flow channel, a gas flowing through the first accumulator can be stabilized, and thus, the pressure in the first accumulator can be stabilized in an early stage.

Further, the shape and position of the introduction flow channel are not particularly limited as long as it can introduce a gas into the accumulator. However, more preferably, the vent holes are formed on opposite sides of the protective plate, between the protective plate and the holding member, and the introduction flow channel is formed such that a gas is introduced toward a center between the vent holes formed on the opposite sides of the protective plate.

Accordingly, gases having flowed into the accumulator can be uniformly flowed through the pair of slits formed on the opposite sides of the protective plate. Consequently, the gases can be uniformly blown to the protective plate from the opposed slits.

As a more preferable configuration, the case body has formed therein a first gas flow channel that passes a gas for cooling the sensor unit, the gas flow channel that passes a gas to be blown to the protective plate is a second gas flow channel that communicates with the first gas flow channel and passes a gas such that the gas is discharged from around the protective plate, and the case body has formed therein a gas supply port and a gas discharge port, the gas supply port being adapted to supply a gas to the first gas flow channel, and the gas discharge port being adapted to discharge the gas supplied to the first gas flow channel to the outside of the sensor device for welding from the case body.

According to such a configuration, a gas supplied from the gas supply port of the case body flows through first gas flow channel. Thus, the sensor unit housed within the case body can be cooled during welding. In addition, since the second gas flow channel communicates with the first gas flow channel, the supplied gas also flows through the second gas flow channel, and is then discharged from around the protective plate. Accordingly, fume and the like, which are generated during welding, can be prevented from flowing toward the protective plate.

Herein, when the pressure of a gas supplied from the gas supply port of the case body is high, that is, when an excessive amount of gas is supplied, the excessive amount of gas supplied to the first gas flow channel can be discharged to the outside of the sensor device for welding from the gas discharge port. Accordingly, a gas can be stably discharged from the protective cover. Consequently, stable measurement and stable welding can be performed with the sensor unit.

Herein, as long as the first gas flow channel, the gas supply port, and the gas discharge port can be formed in the case body, the first gas flow channel may be structured such that, for example, a gas supplied from the gas supply port is supplied to the first gas flow channel after having flowed into the housing space of the case body in which the sensor unit is housed. However, as a more preferable configuration, the first gas flow channel is connected to the gas supply port and the gas discharge port, and the second gas flow channel communicates with the first gas flow channel such that the second gas flow channel branches off the first gas flow channel.

According to such a configuration, a gas supplied from the gas supply port of the case body flows through the first gas flow channel and is then discharged from the gas discharge port. Therefore, even when the supplied gas contains dust or oil, for example, there is no possibility that such dust or oil will stick to the sensor unit. Further, since the second gas flow channel communicates with the first gas flow channel such that it branches off the first gas flow channel, the second gas flow channel is supplied with a relatively cold gas. Thus, a temperature rise of the protective cover during welding can be suppressed.

Herein, the positions of the gas supply port and the gas discharge port are not particularly limited as long as a gas can be supplied to the first gas flow channel of the case body and the supplied gas can be discharged. However, as a more preferable configuration, provided that a surface of the case body on the side where the work pieces are to be welded together with respect to the sensor device for welding is a front face of the case body, and a surface opposite to the front face is a rear face of the case body, the gas supply port is formed on the front face side of the case body, and the gas discharge port is formed on the rear face side of the case body.

According to such a configuration, the front face of the case body, which is more likely to be heated during welding, can be effectively cooled with a gas supplied from the gas supply port. The gas heated with the heat from the front face of the case body flows toward the rear face side of the case body and can be discharged from the gas discharge port. Accordingly, a temperature rise of the sensor unit housed within the case body during welding can be suppressed.

As described above, the structure of the first gas flow channel is not particularly limited as long as the case body can be efficiently cooled with a gas. However, as a more preferable configuration, the case body includes a chassis and a cover, the chassis being adapted to house the sensor unit and having formed therein the pass-through portion, and the cover being adapted to cover an outer wall face of the chassis, at least one of the outer wall face of the chassis or a surface of the cover that faces the outer wall face has formed therein a groove portion with a serpentine shape corresponding to a shape of the first gas flow channel, and the outer wall face of the chassis is covered with the cover so that at least a part of the first gas flow channel is formed.

According to such a configuration, since the first gas flow channel with a serpentine shape is formed between the chassis and the cover, the case body can be cooled more uniformly. In addition, even when dust or oil contained in a gas, for example, sticks to the first gas flow channel, cleaning and maintenance can be easily performed with the cover detached from the chassis and without the sensor unit detached from the chassis.

Herein, a throttle member may be provided around the gas discharge port of the first gas flow channel, for example, as long as the flow rate of a gas to flow into the second gas flow channel can be adjusted. However, as a more preferable configuration, a throttle member, which is adapted to throttle the flow rate of a gas to flow into the second gas flow channel, may be arranged in the portion where the first gas flow channel communicates with the second gas flow channel.

According to such a configuration, as the throttle member is arranged in the portion where the first gas flow channel communicates with the second gas flow channel, a gas with a stable flow rate can be allowed to flow into the second gas flow channel from the first gas flow channel.

Further, as a more preferable configuration of the throttle member, the throttle member has formed therein a plurality of openings with different cross-sectional areas, and a housing portion adapted to house the throttle member is formed in the portion where the first gas flow channel communicates with the second gas flow channel so that one of the plurality of openings is selected and a gas passes through the selected opening.

According to such a configuration, one of the plurality of openings with different cross-sectional areas formed in the throttle member is selected so that a gas from the first gas flow channel can be allowed to flow into the second gas flow channel via the selected opening. Accordingly, a gas to flow into the second gas flow channel can be adjusted with a single throttle member in accordance with the cross-sectional area of the selected opening.

The direction of a gas flowing through the second gas flow channel is not particularly limited as long as the gas can be discharged from the protective cover as described above. However, as a more preferable configuration, provided that a surface of the protective cover on the side where the work pieces are to be welded together with respect to the sensor device for welding is a front face of the protective cover, and a surface opposite to the front face is a rear face of the protective cover, the second gas flow channel is formed such that a gas flows from the front face side to the rear face side of the protective cover.

According to such a configuration, the front face side, which is more likely to be heated during welding, of the protective cover can be effectively cooled with a gas flowing into the second gas flow channel. The gas heated with the heat from the front face of the protective cover flows to the rear face side of the protective cover and is discharged from around the protective plate. Accordingly, a temperature rise of the protective cover during welding can be suppressed. In particular, the front face, which is more likely to be heated, of the protective cover can be efficiently cooled as long as the second gas flow channel has formed therein a cooling flow channel extending along the front face of the protective cover.

Herein, the structure of the second gas flow channel is not particularly limited as long as the protective cover can be efficiently cooled by the cooling flow channel. However, as a more preferable configuration, the second gas flow channel has further formed therein an accumulator, which is adapted to have accumulated therein a gas flowing through the second gas flow channel, and an introduction flow channel, which is adapted to allow a gas from the cooling flow channel to flow into the accumulator, between the protective cover and the case body, and the accumulator around the introduction flow channel has a plurality of fins formed therein.

According to such a configuration, heat transferred from the cooling flow channel to the accumulator can be radiated by the fins formed in the gas flow channel, and the heat radiated by the fins can be discharged to the outside of the sensor device for welding by a gas flowing through the second gas flow channel. Consequently, the temperature of the protective cover becomes less likely to increase, and the sensor unit becomes less likely to be heated.

Advantageous Effects of Invention

According to the present invention, a gas supplied from the case body can be stably discharged from the protective cover.

DESCRIPTION OF EMBODIMENTS

Hereinafter, a sensor device for welding (hereinafter referred to as a "sensor device") according to an embodiment of the present invention will be described with reference to FIGS. 1 to 13.

1. Attached State of Sensor Device 1 and Overall Configuration of Sensor Device 1

Figure 1:
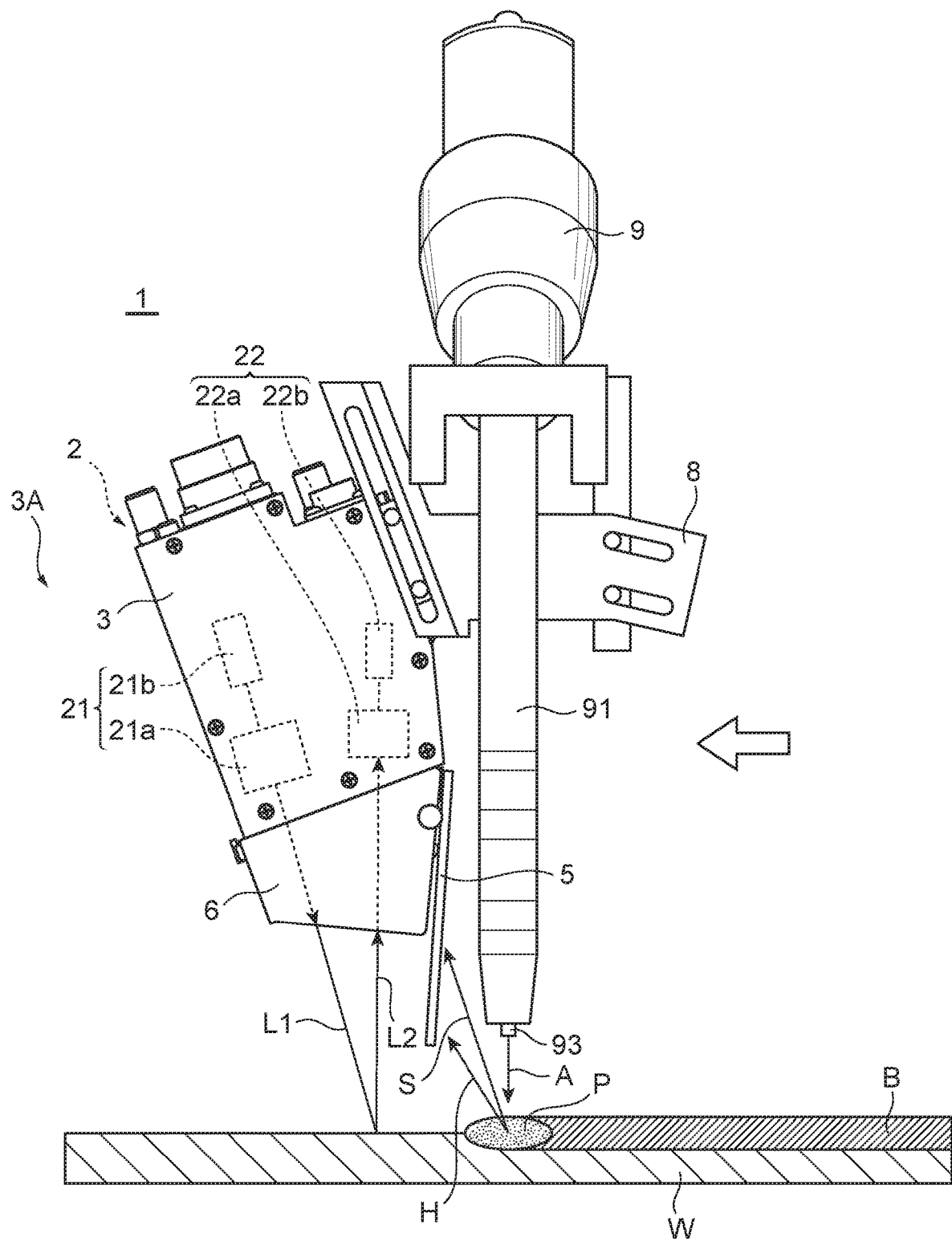
FIG. 1 is a schematic side view of a sensor device for welding, in a state attached to a welding device according to an embodiment of the present invention.

As illustrated in FIG. 1, the sensor device 1 according to the present embodiment is attached to a welding device 9 via an attachment jig 8. A welding torch 91 of the welding device 9 is supplied with a welding wire 93 and a voltage is applied across the tip end of the welding wire 93, which is fed from the welding torch 91, and work pieces W during welding so that an arc A is generated between them. Accordingly, the welding wire 93 and the work pieces W are melted and a molten pool P is generated on the work pieces W and thus, the work pieces W can be welded together. The welding device 9 is moved in the direction of the arrow indicated in FIG. 1 while the molten pool P is formed on the work pieces W so that a welded portion (i.e., bead) B is formed between the work pieces W. FIG. 1 depicts a single work piece as the work pieces W for the purpose of convenience, but in practice, two or more work pieces are welded together through butt welding, fillet welding, or lap welding, for example, and the welding method is not particularly limited. Further, although the present embodiment specifically illustrates an example in which work pieces are welded together through arc welding using a welding wire, other welding methods, such as TIG welding, electron beam welding, laser beam welding, or gas welding, can also be used.

To stably weld the work pieces W together using the welding device 9, it is important to measure the distance between the welding torch 91 and the work pieces W or the shapes of the work pieces W. Thus, in the present embodiment, the shapes of the work pieces W or the distance to the work pieces W is measured using the sensor device 1, for example.

As illustrated in FIG. 1, the sensor device (i.e., sensor head) 1 according to the present embodiment includes a sensor unit 2 and a container 3A housing the sensor unit 2. In the present embodiment, the container 3A includes a housing case (i.e., housing portion) 3 with a protective cover 40 attached thereto, a shielding member (i.e., shielding portion) 5 attached to the housing case 3, and a guide member (i.e., guide portion) 6. In the present embodiment, the housing case 3, the shielding member 5, and the guide member 6 are separable members, but may also be of an integrated structure. In addition, the shielding member 5 and the guide member 6 of the container 3A may be omitted as appropriate.

2. Regarding Sensor Unit 2

The sensor unit 2 is a device for measuring the shapes of the work pieces W or the distance to the work pieces W (from the sensor unit 2) from a detected laser beam (i.e., detected light beam) L2. In the present embodiment, the sensor unit 2 includes, for example, a laser beam projection unit 21 that projects a laser beam L1 onto the surfaces of the work pieces W to be welded together, and a detection unit 22 that detects a laser beam L2 reflected from the surfaces of the work pieces. The laser beam projection unit 21 includes a laser beam source 21b that generates a laser beam, and a projection device (optics) 21a that projects the laser beam L1 generated by the laser beam source 21b onto the work pieces W.

The detection unit 22 includes a photodetector device (optics) 22a that receives a laser beam L2, which is generated as the laser beam L1 projected by the projection device 21a is reflected from the surfaces of the work pieces W, and a detection device 22b that detects the laser beam L2 sent from the photodetector device 22a. The photodetector device 22a sends the received laser beam L2 to the detection device 22b, and the detection device 22b, which is an imaging device (i.e., camera), for example, detects the laser beam L2 and sends data on the detected laser beam L2 to an image processing device (not illustrated) outside or inside of the sensor device. The image processing device measures the shapes (or states) of the work pieces W or the distance from the sensor unit 2 (specifically, from the laser beam source 21b) to the work pieces W, and then calculates the distance between the welding torch 91 and the work pieces W from the measured distance, for example.

Although the present embodiment illustrates the sensor unit 2 including the laser beam projection unit 21 and the detection unit 22 as an exemplary sensor unit, it is also possible to provide a separate laser beam projection unit outside of the sensor device 1 for welding and omit the laser beam projection unit 21 in the sensor unit 2. In such a case, the sensor device 1 for welding does not include the laser beam projection unit 21. Therefore, each portion used for laser beam projection described below (e.g., a pass-through portion 36a for laser beam projection of a case body 30 and a protective portion 44a for laser beam projection of a protective plate 44 described below) can be omitted.

In the present embodiment, although the sensor unit 2 uses the laser beams L1 and L2 to measure the states (i.e., shapes) of the work pieces W or the distance from the detection unit 22 to the work pieces W, it is also possible to detect, as a detection light beam, a light beam, which has been generated from the molten pool P on the work pieces W during welding, or a light beam, which has been reflected into the work pieces W from an external light source or the like, without using the laser beams, for example. In such a case also, the laser beam projection unit 21 in the sensor unit 2 illustrated in the present embodiment may be omitted, and it is acceptable as long as the detection unit includes at least a photodetector device (i.e., optics) that receives a detection light beam directed toward the surfaces of the work pieces W, and an imaging device (i.e., camera) that detects the detection light beam sent from the photodetector device. Since the sensor device 1 for welding does not include the laser beam projection unit 21, each portion used for laser beam projection described below can be omitted. Data on the detection light beam is sent to the image processing device (not illustrated) outside or inside of the sensor device so that the states of the work pieces W (e.g., the molten state of the molten pool P) can be measured. A voltage applied across the tip end of the welding wire 93 fed from the welding torch 91 and the work pieces W during welding may be controlled on the basis of the measured states of the work pieces W.

3. Regarding Housing Case 3

Figure 4:
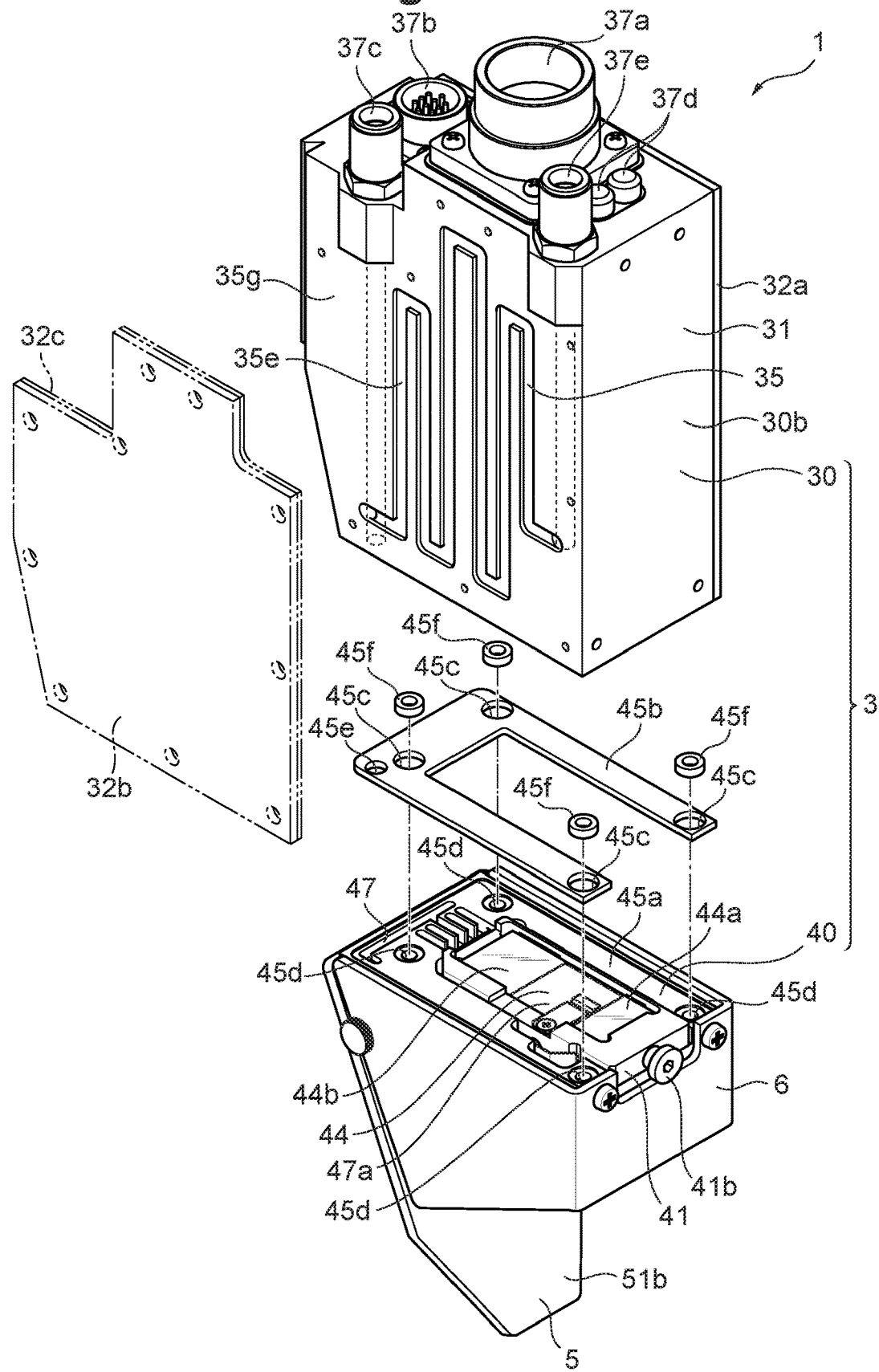
FIG. 4 is a schematic exploded perspective view of the sensor device for welding illustrated in FIG. 3 with a cover of a case body removed.
Figure 5:
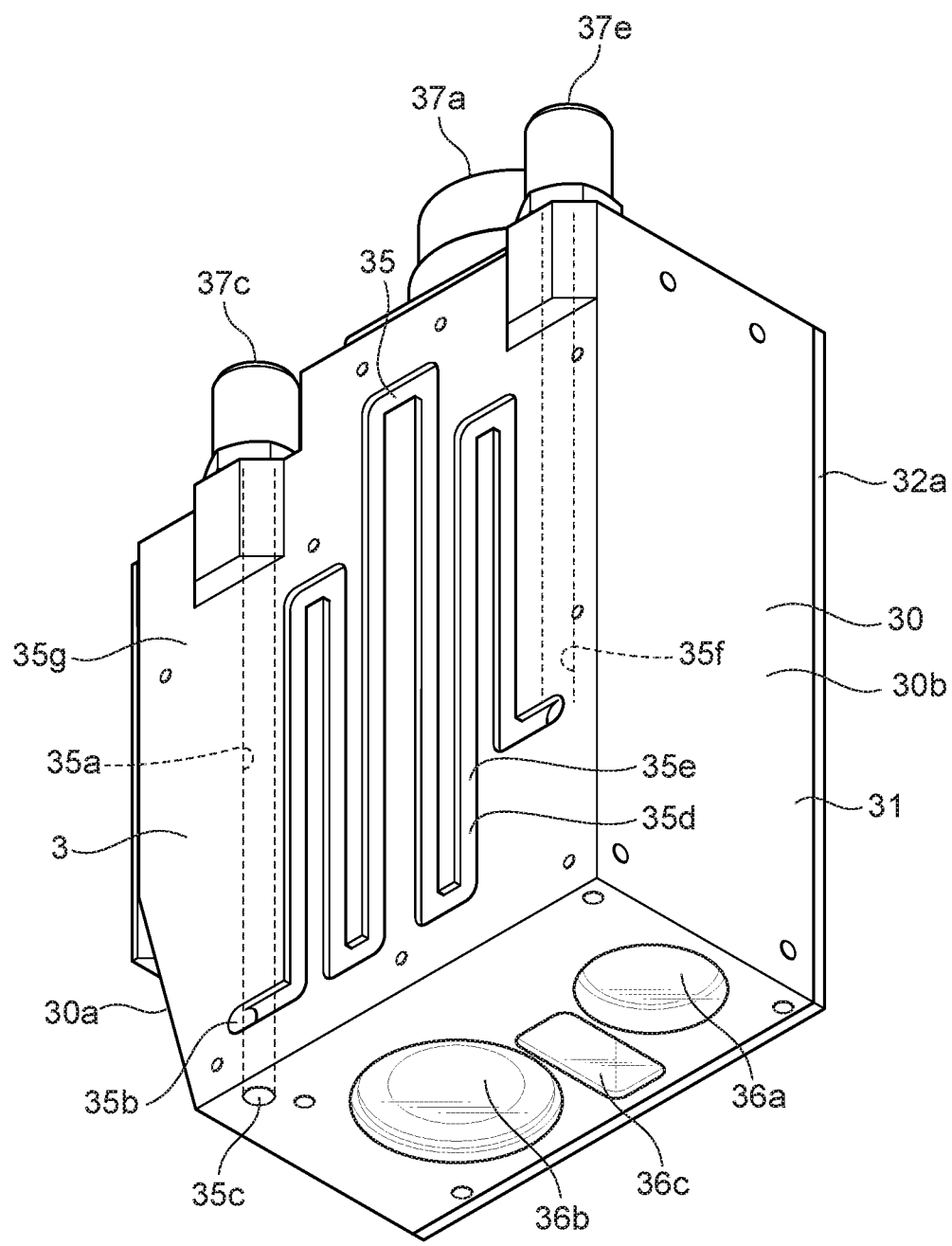
FIG. 5 is a schematic perspective view of the case body of the sensor device for welding illustrated in FIG. 4 seen from the bottom side.

The housing case 3 houses the sensor unit 2 and has formed therein pass-through portions (specifically, see a pass-through portion 36a for laser beam projection and a pass-through portion 36b for detection in FIG. 5) that pass the laser beam L1 emitted from the laser beam projection unit 21 and the laser beam L2 directed toward the detection unit 22, respectively. The pass-through portions may be openings, for example, as long as they can transmit the laser beams L1 and L2, respectively, and the openings may be covered with materials (e.g., transparent resin or glass) that can transmit the laser beams L1 and L2, respectively. In the present embodiment, the housing case 3 includes the case body 30 and the protective cover 40 (see FIG. 4).

3-1. Regarding Case Body 30

Figure 2:
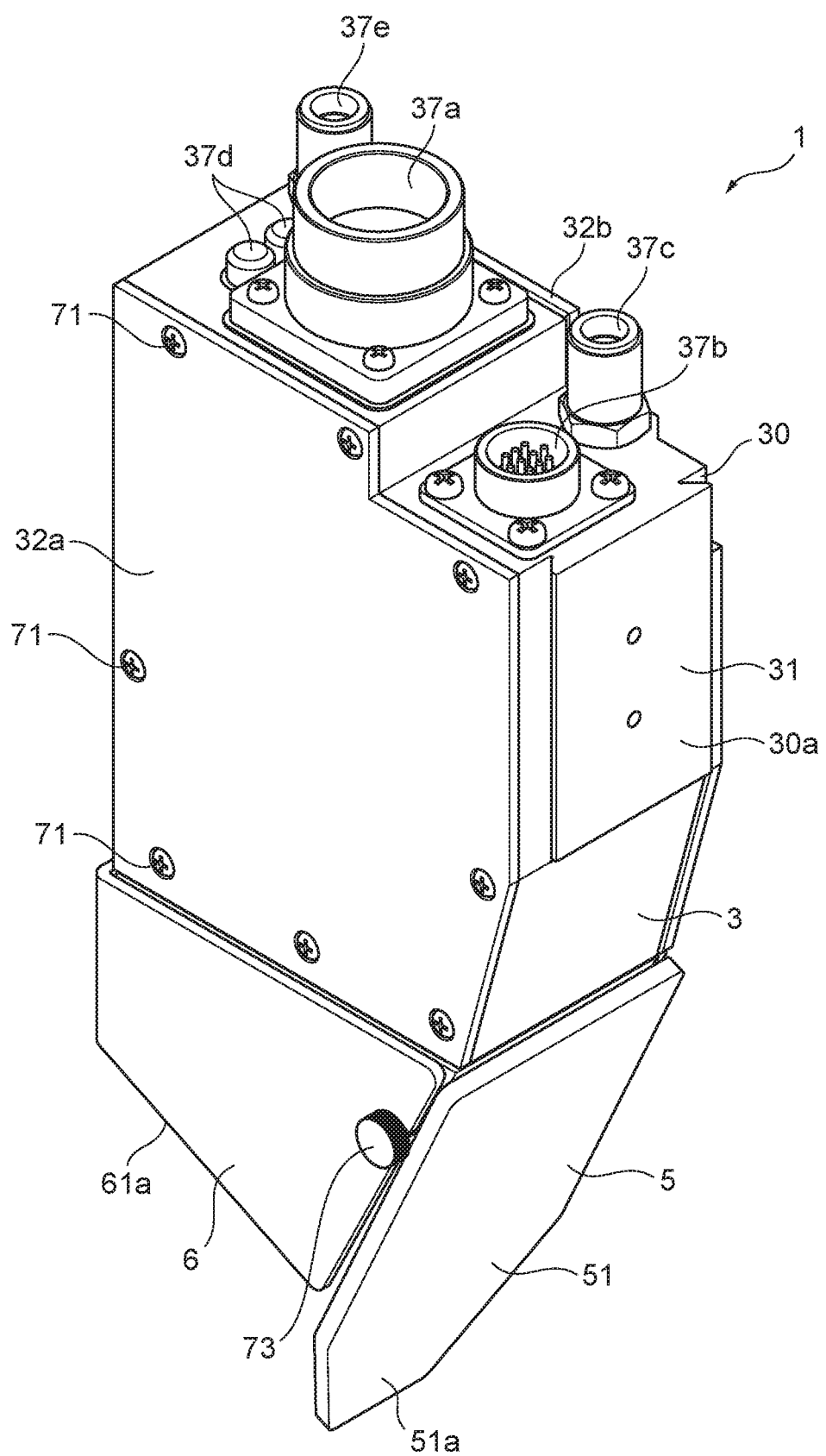
FIG. 2 is a schematic perspective view of the sensor device for welding illustrated in FIG. 1 seen from one side thereof.
Figure 3:
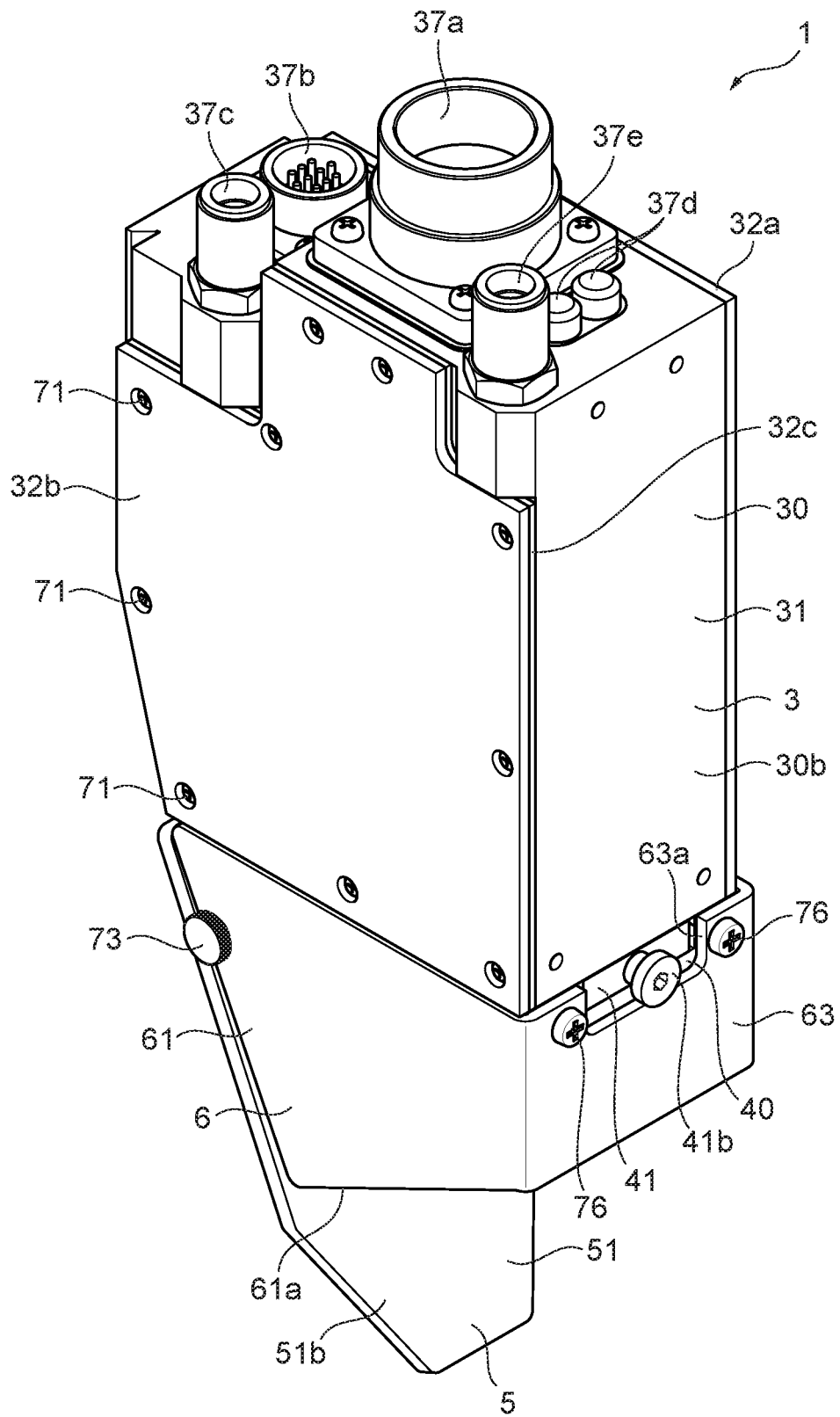
FIG. 3 is a schematic perspective view of the sensor device for welding illustrated in FIG. 1 seen from the other side thereof.

In the present embodiment, the case body 30 is an assembly for housing the sensor unit 2. As illustrated in FIGS. 2 and 3, the case body 30 includes a chassis 31, which has a recess (not illustrated) for housing the sensor unit 2, and covers 32a and 32b attached to the opposite sides of the chassis 31 with fasteners 71, such as screws. The cover 32a on one side is adapted to cover the recess in which the aforementioned sensor unit 2 is housed. As illustrated in FIGS. 4 and 5, the cover 32b on the other side covers the chassis 31 so as to form a first gas flow channel 35 with a serpentine shape in the case body 30. Supplying a gas to the first gas flow channel 35 can cool the sensor unit 2 in the case body 30 and reduce a temperature rise of the sensor unit 2 during welding. It should be noted that FIGS. 4 and 5 each illustrate the case body 30 with the cover 32b detached.

Herein, examples of a gas supplied to the first gas flow channel 35 include air (atmosphere), helium gas, argon gas, nitrogen gas, carbon dioxide gas, and a mixed gas thereof. Preferably, a gas that can cool the sensor device 1 for welding during welding and is chemically stable with respect to the portions of the work pieces W to be welded together is used. For example, a gas from a source of supply of a shielding gas for welding (not illustrated) may be used.

The upper face of the case body 30 is provided with a connecting terminal 37a for outputting detected signals from the sensor unit 2, for example, and a connecting terminal 37b for supplying power to the sensor unit 2 and receiving control signals for the sensor unit 2, for example. Further, the upper face of the case body 30 is provided with a gas supply port 37c for supplying a gas to the first gas flow channel 35 and to the protective cover 40, and a gas discharge port 37e for discharging a gas from the first gas flow channel 35. Besides, a lamp 37d that displays the ON or OFF state of a power supply for the sensor unit 2 is also provided.

As illustrated in FIG. 5, the case body 30 housing the sensor unit 2 has formed therein, as pass-through portions, a pass-through portion 36a for laser beam projection that passes the laser beam L1 from the laser beam projection unit 21, and a pass-through portion 36b for detection that passes the laser beam L2 directed toward the detection unit 22. It should be noted that the case body 30 also has a detection window 36c for a sensor (not illustrated) to check if a cartridge 41 described below is present or absent. In the present embodiment, the pass-through portion 36a for laser beam projection and the pass-through portion 36b for detection are formed individually in the case body 30, but they may be formed continuously as long as the detection accuracy of the sensor unit 2 can be secured. In the present embodiment, the pass-through portion 36a for laser beam projection and the pass-through portion 36b for detection are portions where circular plates, which transmit the laser beams L1 and L2, respectively, are arranged within circular openings.

3-2. Regarding Protective Cover 40

Figure 6:
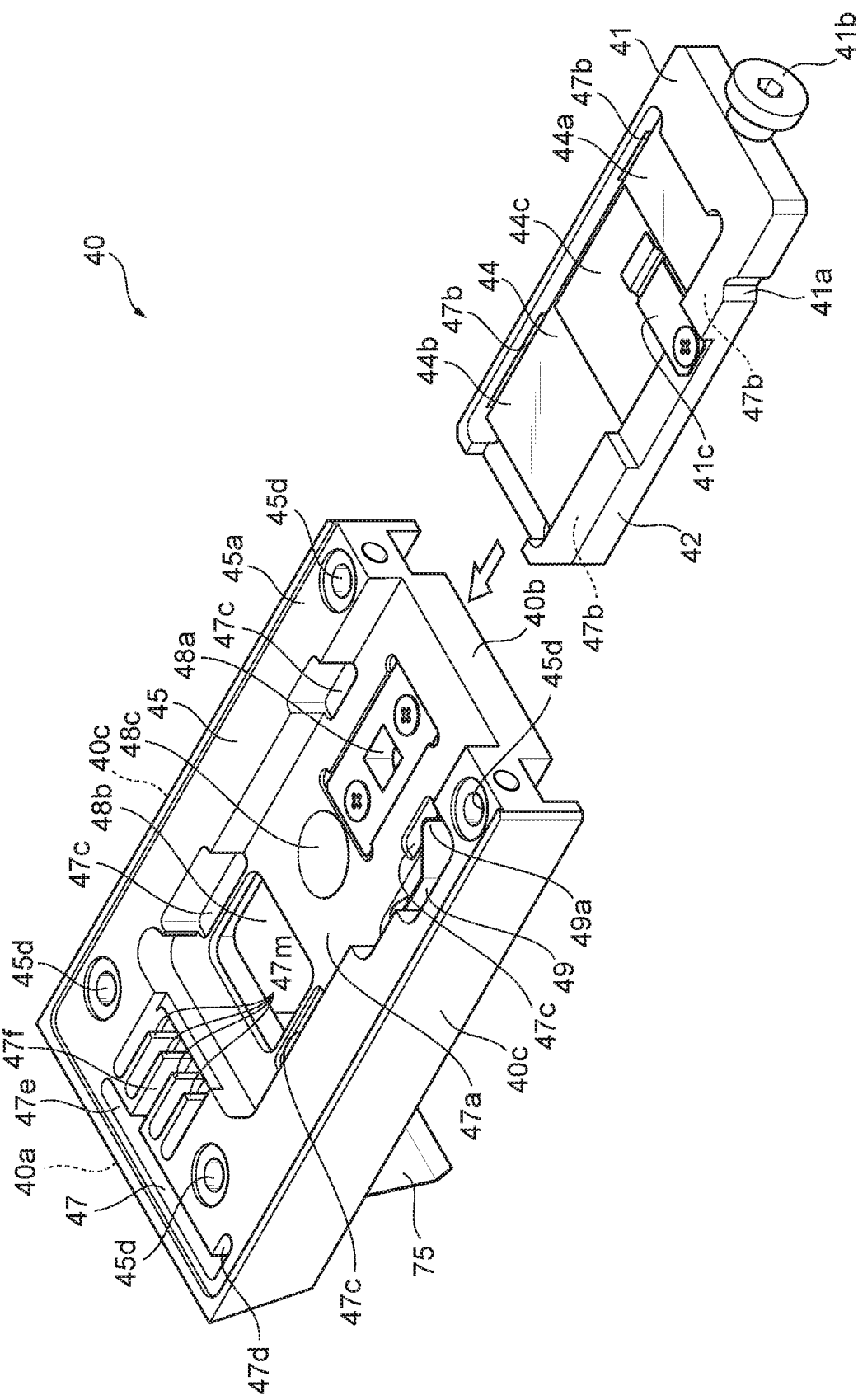
FIG. 6 is an exploded perspective view of the protective cover illustrated in FIG. 4.

The protective cover 40 partially forms the housing case 3, and includes the protective plate 44. The protective cover 40 is attached to the case body 30 from its bottom side with fasteners 72, such as screws, inserted through through-holes 45d so that the pass-through portion 36a for laser beam projection and the pass-through portion 36b for detection are covered with the protective plate 44 (e.g., see FIGS. 10 and 11). More specifically, as illustrated in FIG. 6, the protective cover 40 includes the cartridge 41 including the protective plate 44, and a holder 45 detachably holding the cartridge 41. The holder 45 is attached to the case body 30 from its bottom side with the fasteners 72.

The holder 45 of the protective cover 40 includes a holder body 45a and a sealing member 45b. The holder body 45a has formed therein the second gas flow channel 47 so that a gas can flow through a portion between the protective cover 40 and the case body 30 from the first gas flow channel 35 formed in the case body 30. The sealing member 45b is a member formed between the holder body 45a and the case body 30, for preventing leakage of a gas flowing through the second gas flow channel 47, and is made of a flexible sheet material, such as rubber or resin.

Further, the holder body 45a and the sealing member 45b have formed therein through-holes 45c and 45d. A ring-shaped spacer 45f is inserted through each of the through-holes 45c and 45d, The spacer 45f is arranged so as to be seated around a portion of the holder body 45a where each through-hole 45c is formed. As described above, as four spacers 45f are seated in the through-holes 45d of the holder body 45a and are further inserted through the through-holes 45c of the sealing member 45b, the sealing member 45b can be arranged at a proper position. This can avoid degradation of the sealing property of the second gas flow channel 47 formed between the protective cover 40 and the case body 30 due to positional deviations of the sealing member 45b between them. The holder 45 is attached to the case body 30 with the fasteners 72, such as bolts, inserted through the spacers 45f. In addition, the sealing member 45b has formed therein a communication hole 45e to allow a gas to flow through the second gas flow channel 47 formed between the protective cover 40 and the case body 30 from the first gas flow channel 35 formed in the case body 30.

Each spacer 45f is preferably made of a material with lower thermal conductivity than those of the materials of the case body 30 and the protective cover 40. For example, when each of the case body 30 and the protective cover 40 is made of a metallic material, each spacer 45f is made of a ceramic material. Further, since each spacer 45f is made of a material with lower thermal conductivity than those of the protective cover 40 and the case body 30, the amount of heat transferred to the case body 30 from the protective cover 40 via the spacer 45f can be reduced.

As illustrated in FIG. 6, the holder body 45a has attached thereto a leaf spring 49 that is bent so as to form a projection 49a, and the projection 49a of the leaf spring 49 engages a recess 41a of the cartridge 41 so that the cartridge 41 can be held in the holder 45. Meanwhile, when the cartridge 41 is pulled out of the holder 45 with a gripper 41b of the cartridge 41 being gripped, the leaf spring 49 elastically deforms. Therefore, the recess 41a of the cartridge 41 and the projection 49a of the leaf spring 49 can be easily disengaged.

The cartridge 41 includes the protective plate 44, and the protective plate 44 is detachably held in the cartridge body 42 by a clip 41c. The protective plate 44 is preferably made of a transparent material that transmits the laser beams L1 and L2, and examples of such material include glass and resin. The protective plate 44 includes a protective portion 44a for laser beam projection that covers the pass-through portion 36a for laser beam projection, a protective portion 44b for detection that covers the pass-through portion 36b for detection, and a cover portion 44c having formed thereon a metal film, such as aluminum foil, between the protective portion 44a for laser beam projection and the protective portion 44b for detection. With the cover portion 44c provided, it is possible to easily check if the protective plate 44 is arranged in the cartridge 41.

In the present embodiment, in a state in which the cartridge 41 is loaded, the pass-through portion 36a for laser beam projection and the pass-through portion 36b for detection of the case body 30 are covered with the protective portion 44a for laser beam projection and the protective portion 44b for detection of the protective plate 44, respectively. This can suppress entry of fume and the like, which are generated during welding, into the pass-through portion 36a for laser beam projection and the pass-through portion 36b for detection.

4. Regarding Gas Flow Channel 4-1. Regarding First Gas Flow Channel 35

As described above, in the present embodiment, as illustrated in FIG. 4, the case body 30 has formed therein the first gas flow channel 35 that passes a gas for cooling the sensor unit 2. The protective cover 40 has formed therein the second gas flow channel 47 that communicates with the first gas flow channel 35 and passes a gas so that the gas is discharged toward the work pieces W (i.e., downward) from around the protective plate 44. The case body 30 has the gas supply port 37c that supplies a gas to the first gas flow channel 35, and the gas discharge port 37e that discharges the gas supplied to the first gas flow channel 35 to the outside of the sensor device 1 for welding from the case body 30.

The gas supplied from the gas supply port 37c of the case body 30 flows through the first gas flow channel 35, and thus can cool the sensor unit 2 housed within the case body 30 during welding. Consequently, since the heat resistant temperatures of the components within the sensor device 1 can be made low, relatively inexpensive materials with low heat resistant temperatures can be used for the sensor device 1. Further, since arrangement of a component that is only aimed at providing a heat shielding property in the sensor device 1 can be omitted, and the heat radiation space in the case body 30 can be suppressed, the size of the case body 30 can be reduced. Thus, mechanical interference between the sensor device 1 and other members, such as work pieces, during welding can be suppressed. Further, since the second gas flow channel 47 communicates with the first gas flow channel 35, the supplied gas also flows through the second gas flow channel 47 and is discharged from around the protective plate 44. Accordingly, fume and the like, which are generated during welding, can be prevented from flowing toward the protective plate 44.

Herein, when the pressure of a gas supplied from the gas supply port 37c of the case body 30 is high, that is, when an excessive amount of gas is supplied, the excessive amount of gas supplied to the first gas flow channel 35 can be discharged from the gas discharge port 37e. Accordingly, the gas can be stably discharged from the protective cover 40. Consequently, stable measurement and stable welding can be performed with the sensor unit 2.

Herein, if the first gas flow channel 35 can cool the sensor unit 2, a first cooling flow channel 35a described below need not be formed, and in such a case, a gas may be supplied to the inside of the case body 30 from the gas supply port 37c and the supplied gas may be blown directly to the sensor unit 2. However, in the present embodiment, as a preferable configuration, as illustrated in FIGS. 4 and 5, the first gas flow channel 35 is connected at its opposite ends to the gas supply port 37c and the gas discharge port 37e, and the second gas flow channel 47 communicates with the first gas flow channel 35 such that it branches off the first gas flow channel 35.

Specifically, in the present embodiment, the first gas flow channel 35 includes a first cooling flow channel 35a that is formed in a region of from the gas supply port 37c to the inside of the case body 30 on its front face 30a side (i.e., inside a wall portion forming the front face 30a). The first gas flow channel 35 includes a second cooling flow channel 35d that branches off the first cooling flow channel 35a at a branch port 35b. The second cooling flow channel 35d is formed by covering a groove portion 35e with a serpentine shape, which is formed on an outer wall face (i.e., side face) 35g of the chassis 31, with the cover 32b. It should be noted that the first cooling flow channel 35a communicates with a second gas flow channel 47 at a communication port 35c of the case body 30. Further, the second cooling flow channel 35d communicates with a third cooling flow channel 35f formed inside a wall portion forming a rear face 30b of the case body 30, and the third cooling flow channel 35f communicates with the gas discharge port 37e. As described above, since the first gas flow channel 35 does not communicate directly with a space in which the sensor unit 2 is housed, there is no possibility that a gas in the first gas flow channel 35 will be blown to the sensor unit 2.

Accordingly, since the gas supplied from the gas supply port 37c of the case body 30 will not flow through the space in which the sensor unit 2 is housed, but flows through the first gas flow channel 35 and is then discharged from the gas discharge port 37e, there is no possibility that even if the supplied gas contains dust or oil, for example, such dust or oil will stick to the sensor unit 2. Further, since the second gas flow channel 47 communicates with the first gas flow channel 35 such that it branches off the first gas flow channel 35, the second gas flow channel 47 is supplied with a relatively cold gas. Consequently, a temperature rise of the protective cover 40 during welding can be suppressed.

As illustrated in FIGS. 2 to 5, the case body 30 has formed therein a front face 30a, which is a surface on the side where the work pieces W are to be welded together with respect to the sensor device 1, and a rear face 30b, which is a surface opposite to the front face 30a, Herein, the positions where the gas supply port 37c and the gas discharge port 37e are formed are not particularly limited as long as the sensor unit 2 can be efficiently cooled. In the present embodiment, as a preferable configuration, the gas supply port 37c is formed on the front face 30a side of the case body 30, and the gas discharge port 37e is formed on the rear face 30b side of the case body 30.

Accordingly, a gas supplied from the gas supply port 37c can effectively cool the front face 30a, which is more likely to be heated during welding, of the case body 30. The gas heated with the heat from the front face 30a of the case body 30 flows to the rear face 30b side of the case body 30, and thus can be discharged from the gas discharge port 37e. Accordingly, a temperature rise of the sensor unit 2 housed within the case body 30 during welding can be suppressed.

Herein, the first gas flow channel 35 may be formed using a tube that is connected to the gas supply port 37c and the gas discharge port 37e, for example, as long as the inside of the case body 30 can be cooled with a gas passing through the first gas flow channel 35, for example. However, in the present embodiment, as described above, as a more preferable configuration, the outer wall face of the chassis 31 of the case body 30 has formed therein the groove portion 35e with a serpentine shape corresponding to the shape of the second cooling flow channel 35d of the first gas flow channel 35, and the groove portion 35e of the chassis 31 is covered with the cover 32b so that the second cooling flow channel 35d of the first gas flow channel 35 is formed. In the present embodiment, a sealing member 32c is arranged in the portion of the surface of the cover 32b in contact with the outer wall face 35g of the chassis 31. Although the groove portion 35e with a serpentine shape is provided on the chassis 31 side in the present embodiment, it s acceptable as long as a groove portion with a serpentine shape corresponding to the shape of the second cooling flow channel 35d is formed on at least one of the outer wall face 35g of the chassis 31 or the surface of the cover 32b in contact with the outer wall face 35g, for example.

As described above, in the present embodiment, since the second cooling flow channel 35d with a serpentine shape is formed between the chassis 31 and the cover, the case body 30 can be cooled more uniformly. Further, even when dust or oil contained in a gas, for example, sticks to the second cooling flow channel 35d, cleaning and maintenance can be easily performed with the cover 32b detached from the chassis 31 and without the sensor unit 2 detached from the chassis 31.

4-2. Regarding Throttle Member 43

Figure 7:
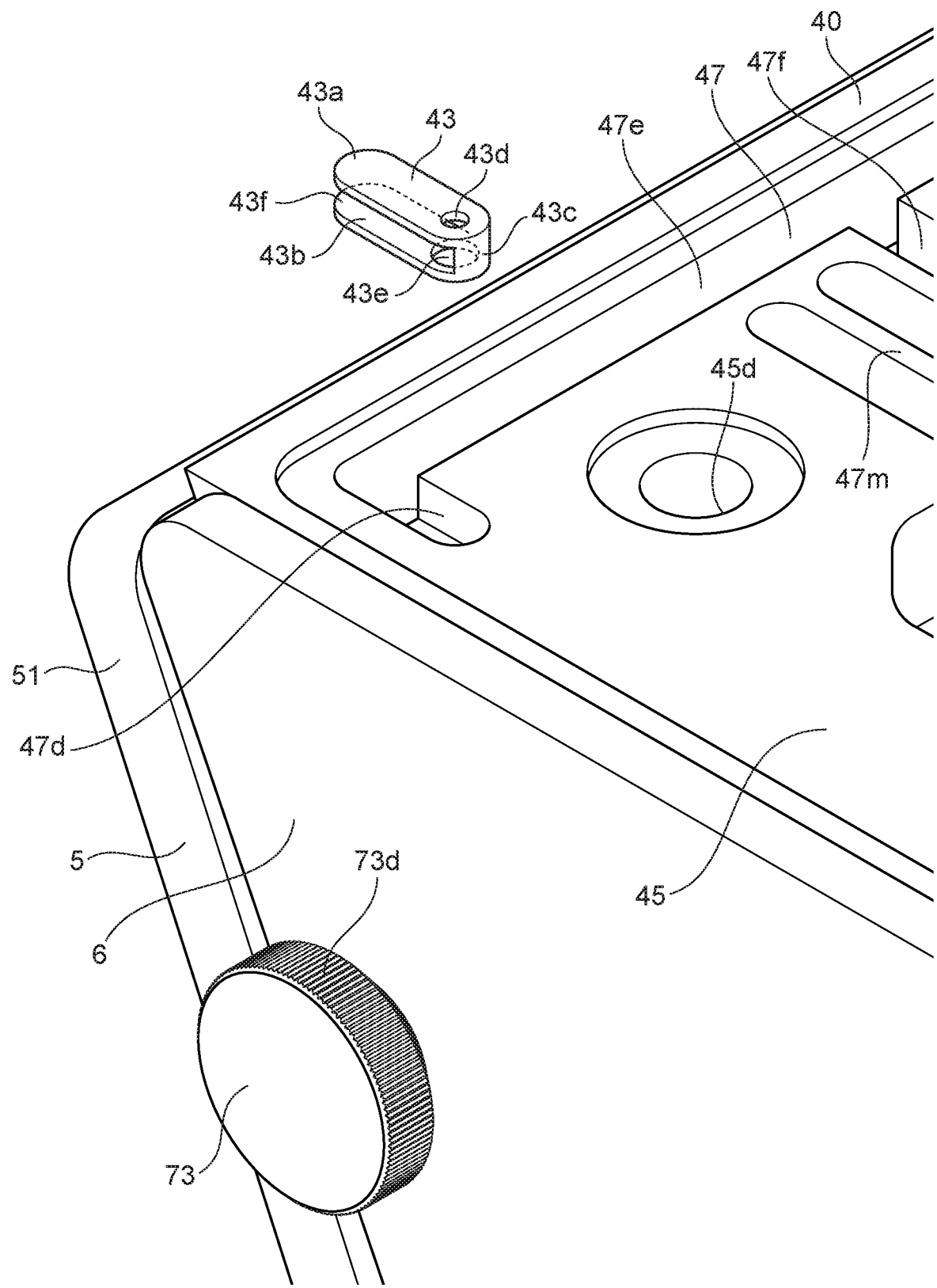
FIG. 7 is an enlarged view of a portion including the protective cover illustrated in FIG. 4.

Herein, in order to allow a gas with a desired flow rate to flow through the second gas flow channel 47, the gas supply port 37c or the gas discharge port 37e may be provided with a flow control valve, for example. However, in the present embodiment, as a more preferable configuration, as illustrated in FIG. 7, a portion where the first gas flow channel 35 communicates with the second gas flow channel 47 is provided with a throttle member 43 that throttles the flow rate of a gas to flow into the second gas flow channel 47. More specifically, the throttle member 43 is housed within a housing portion 47d that is formed on the most upstream side of the second gas flow channel 47. Accordingly, a gas with a stable flow rate can be allowed to flow into the second gas flow channel 47 from the first gas flow channel 35.

Herein, the throttle member 43 is formed of, as a more preferable configuration, a pair of opposed plate-like portions 43a and 43b, and a coupling portion 43c coupling them together at one ends thereof. The plate-like portions 43a and 43b have formed therein openings 43d and 43e with different cross-sectional areas, respectively. The housing portion 47d in which the first gas flow channel 35 communicates with the second gas flow channel 47 has a shape capable of housing the throttle member 43 with one of the two openings 43d (or 43e) selected so that a gas passes through the selected opening 43d (or 43e). Specifically, in the present embodiment, one of the two openings 43d (or 43e) may be selected by reversing the positions of the pair of opposed plate-like portions 43a and 43b.

Figure 9:
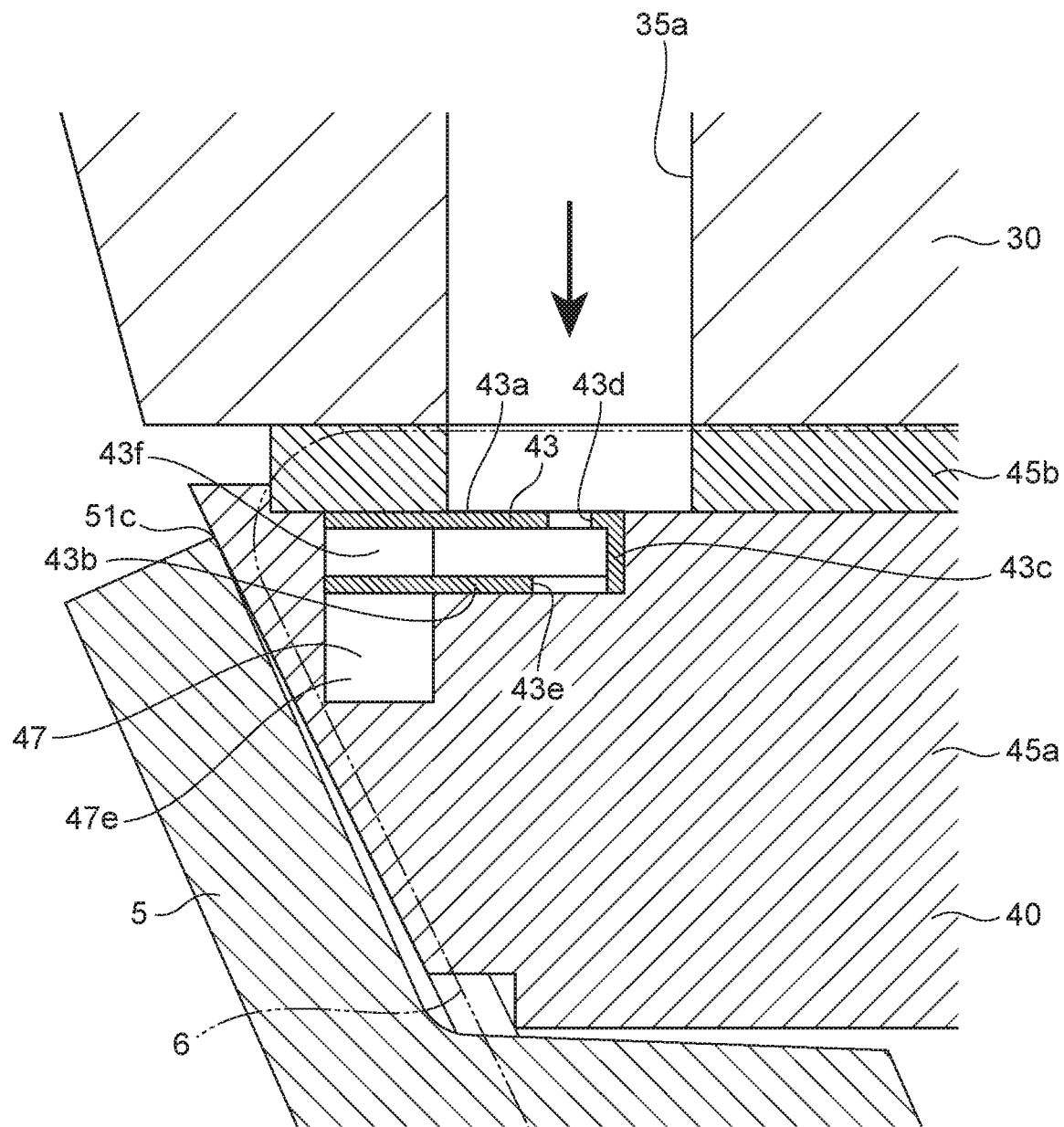
FIG. 9 is a cross-sectional view in the direction of the arrows along line A-A of FIG. 8.

In this manner, as illustrated in FIG. 9, using a single throttle member 43 can allow a gas flowing through the first cooling flow channel 35a to pass through the opening 43d of the throttle member 43 and then pass through a space 43f between the plate-like portions 43a and 43b so that it can flow into the second gas flow channel 47. At this time, since one of the two openings 43d (or 43e) can be selected, the amount of a gas to flow into the second gas flow channel 47 can be adjusted in accordance with the cross-sectional area of the selected opening 43d (or 43e). Although the throttle member 43 has formed therein two openings with different cross-sectional areas in the present embodiment, the number of the openings is not particularly limited as long as one of a plurality of openings can be selected.

4-3 Regarding Second Gas Flow Channel 47 (i.e., Gas Flow Channel)

Figure 8:
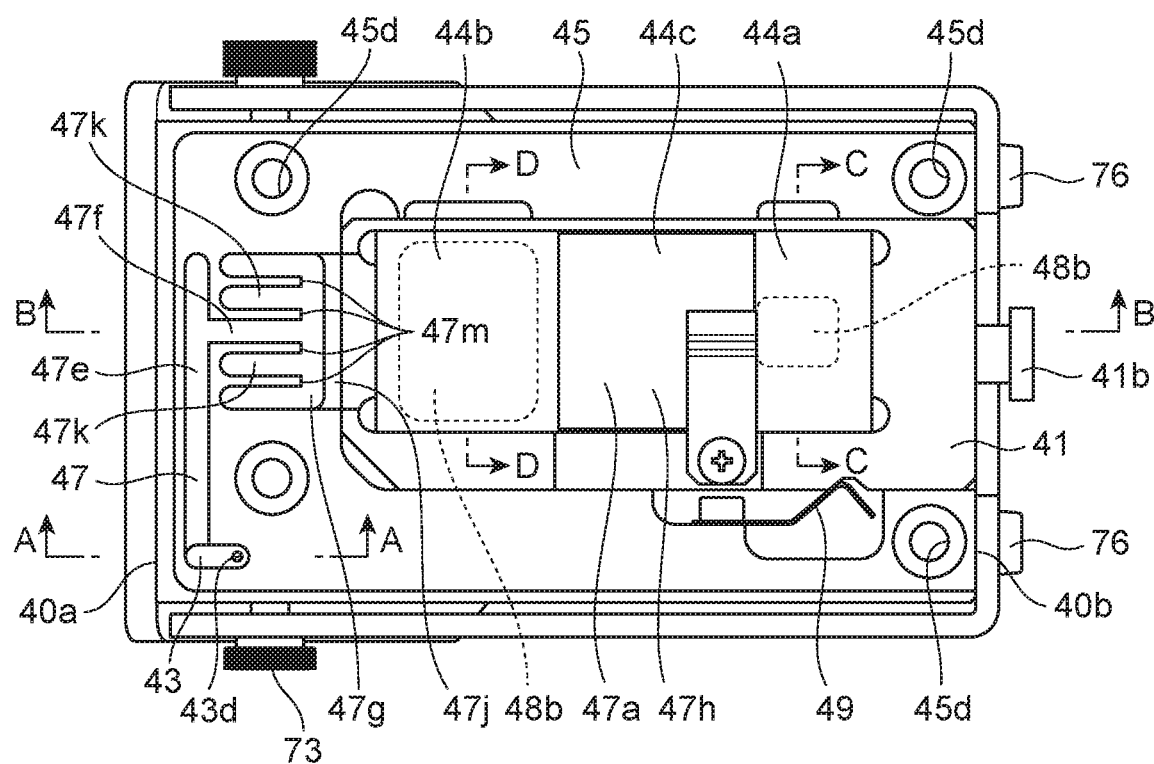
FIG. 8 is a plan view of the sensor device for welding illustrated in FIG. 4 with the case body removed.
Figure 10:
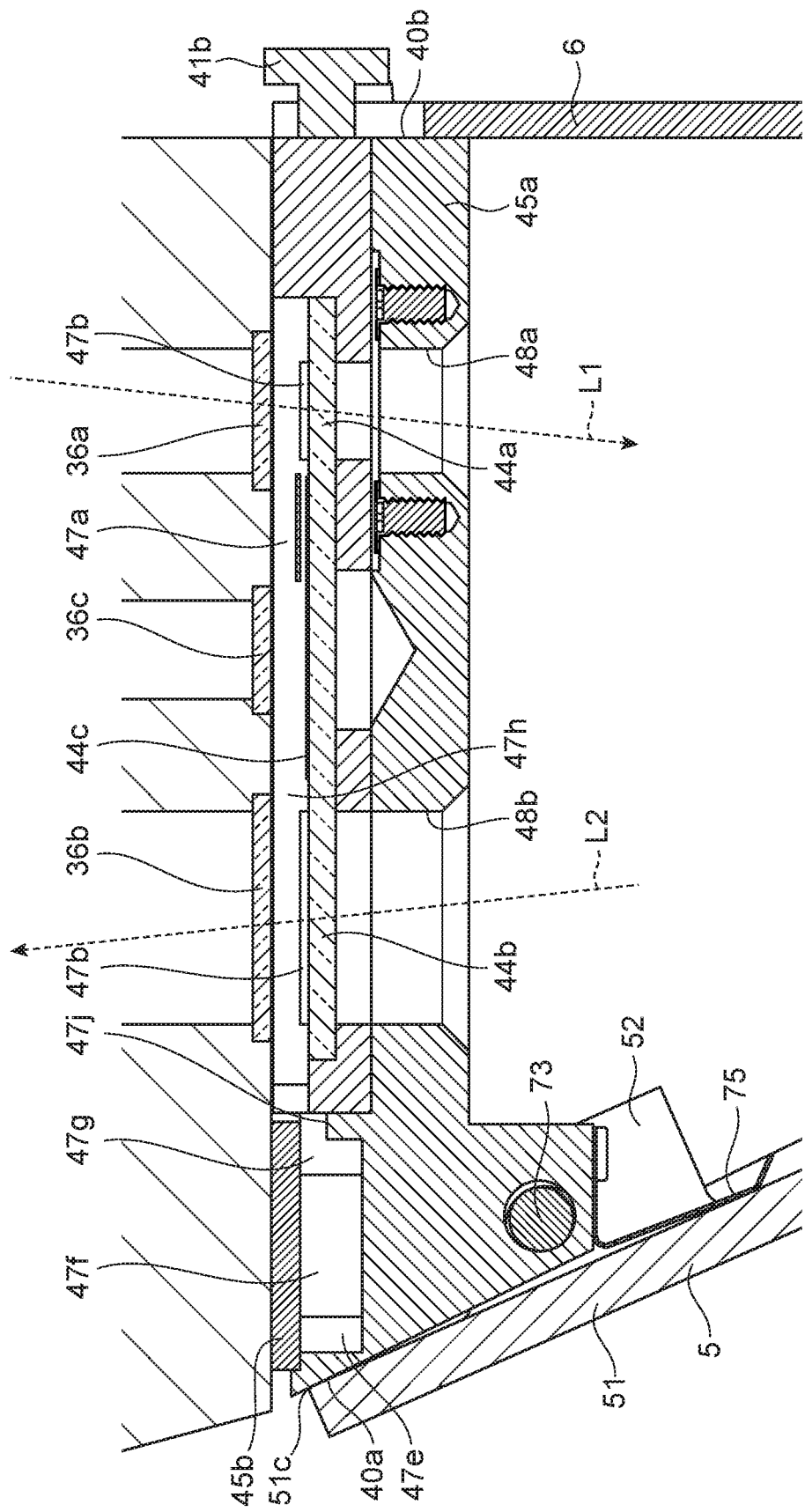
FIG. 10 is a cross-sectional view in the direction of the arrows along line B-B of FIG. 8.

In the present embodiment, as a preferable configuration, the second gas flow channel 47 communicating with the first gas flow channel 35 is formed between the protective cover 40 and the case body 30, and is formed such that a gas flows from the front face 40a side to the rear face 40b side of the protective cover 40 (FIGS. 8 and 10). The gas having flowed into the second gas flow channel 47 from the first gas flow channel 35 can effectively cool the front face 40a side, which is more likely to be heated during welding, of the protective cover 40. The gas heated with the heat from the front face 40a of the protective cover 40 flows toward the rear face 40b side of the protective cover 40 and is then discharged from around the protective plate 44. Accordingly, a temperature rise of the protective cover 40 during welding can be suppressed.

The second gas flow channel 47 has formed therein, as a more preferable configuration, a cooling flow channel 47e extending along the front face 40a of the protective cover 40. Accordingly, the front face 40a, which is more likely to be heated, of the protective cover 40 can be efficiently cooled.

In the second gas flow channel 47, an accumulator 47a is formed on the downstream side of the cooling flow channel 47e. The accumulator 47a is formed between the protective cover 40 and the case body 30 as described above. Forming the accumulator 47a can stabilize the pressure of a gas in the second gas flow channel 47 in the space formed between the cartridge 41 and the case body 30.

The accumulator 47a has formed therein slits (i.e., vent holes) 47b through which gases are allowed to flow out. Accordingly, gasses throttled through the slits 47b from the accumulator 47a can be allowed to flow out from the accumulator 47a at a stable pressure.

Herein, the vent holes are not limited to the slits 47b as long as gases can be allowed to flow out through the vent holes toward the protective plate 44, and may be circular holes, long holes, rectangular holes, or holes having such holes intermittently arranged therein, for example. In the present embodiment, the slits 47b are provided as the vent holes. Therefore, the slits 47b serve to throttle gas flows and thus can maintain the pressure in the accumulator 47a constant. Further, gases with increased flow velocities are discharged in band shapes from the slits 47b.

Further, the number and positions of the slits (i.e., vent holes) 47b are not particularly limited as long as gases from the accumulator 47a can be discharged to the outside after being blown to the protective plate 44. However, in the present embodiment, as a more preferable configuration, the slits 47b are formed on the opposite sides of the accumulator 47a with the protective plate 44 sandwiched therebetween, between the protective plate 44 and the cartridge body (i.e., holding member) 42.

Specifically, the slits 47b are formed at positions sandwiching the protective portion 44a for laser beam projection of the protective plate 44 and at positions sandwiching the protective portion 44b for detection of the protective plate 44. In this manner, providing the pair of slits 47b and 47l on the opposite sides of the accumulator 47a with the protective plate 44 sandwiched therebetween allows gases to be uniformly blown to each of the protective portion 44a for laser beam projection and the protective portion 44b for detection from its opposite sides. Herein, in the present embodiment, the cartridge body 42 and the holder 45 correspond to the "holding member" as referred to in the present invention.

Herein, the second gas flow channel 47 further has formed therein an introduction flow channel 47f that introduces a gas into the accumulator 47a from the cooling flow channel 47e, in addition to the accumulator 47a (see FIGS. 6 and 8). The cooling flow channel 47e communicates with the introduction flow channel 47f, and a plurality of fins (i.e., partition walls) 47m extending in one direction are formed in the accumulator 47a around the introduction flow channel 47f. In the present embodiment, as a more preferable configuration, the second gas flow channel 47 forming the introduction flow channel 47f to the accumulator 47a is formed such that a gas flows from the front face 40a side to the rear face 40b side of the protective cover 40, and the fins 47m extend from the front face 40a side to the rear face 40b side in the accumulator 47a.

Accordingly, heat transferred to the accumulator 47a from the cooling flow channel 47e is radiated by the fins 47m formed in the accumulator 47a, and the heat radiated by the fins 47m can be discharged to the outside of the sensor device 1 with the gas flowing through the second gas flow channel 47. Consequently, the temperature of the protective cover 40 becomes less likely to increase and the sensor unit 2 becomes less likely to be heated.

Herein, the introduction flow channel 47f that introduces a gas into the accumulator 47a is preferably formed such that a gas is introduced toward the center between the pair of slits 47b and 47b that are formed on the opposite sides of the protective plate 44. Accordingly, gases having flowed into the accumulator 47a can be allowed to uniformly flow through the pair of slits 47b and 47b that are formed on the opposite sides of the protective plate 44. Accordingly, the gases can be uniformly blown to the protective portion 44a for laser beam projection and the protective portion 44b for detection of the protective plate 44 from the opposed slits 47b and 47b.

Further, as illustrated in FIGS. 8 and 10, the accumulator 47a preferably includes a first accumulator 47g and a second accumulator 47h arranged in this order from the upstream side. Specifically, the first accumulator 47g is formed between the holder 45 and the case body 30, and is connected to the introduction flow channel 47f that introduces a gas into the accumulator 47a. The second accumulator 47h is formed between the cartridge 41 and the case body 30, and the slits 47b are formed in the second accumulator 47h.

As illustrated in FIG. 10, a throttle portion 47j, which throttles the flow rate of a gas to flow into the second accumulator 47h from the first accumulator 47g, is formed between the first accumulator 47g and the second accumulator 47h. Providing the throttle portion 47j can once throttle a gas, which has been accumulated in the first accumulator 47g, before it flows into the second accumulator 47h. Therefore, the pressure in the second accumulator 47h having the slits 47b formed therein can be stabilized more, Consequently, stable gases can be allowed to flow out through the slits 47b.

Herein, as illustrated in FIG. 8, the first accumulator 47g preferably has formed therein a pair of spaces 47k extending along the introduction flow channel 47f on the opposite sides thereof. In particular, each space 47k formed in the first accumulator 47g more preferably has partition walls (i.e., fins) 47m formed along the introduction flow channel 47f to partition the space 47k. In the present embodiment, the partition walls 47m are identical portions to the aforementioned fins 47m, and have two functions.

As described above, since the pair of spaces 47k are formed along the introduction flow channel 47f on the opposite sides thereof, a gas having flowed from the introduction flow channel 47f can uniformly flow through the first accumulator 47g and thus can stabilize the pressure in the first accumulator 47g more. In particular, since the partition walls 47m that partition each space 47k are provided along the introduction flow channel 47f, a gas flowing through the first accumulator 47g can be stabilized and the pressure in the first accumulator 47g can be stabilized in an early stage. The number and shapes of the partition walls 47m are not particularly limited, but the partition walls 47m formed in the respective spaces 47k are preferably line-symmetrical with respect to the introduction flow channel 47f.

The second gas flow channel 47 has formed therein outlet ports for discharging gases, which have been blown to the protective plate 44, to the side on which the laser beam L1 is projected, and laser beams pass through the outlet ports. Specifically, in the present embodiment, the outlet ports include, in a state in which the cartridge 41 is loaded into the holder 45, an outlet port 48a for laser beam projection through which a gas, which has been blown to the protective portion 44a for laser beam projection, is discharged, and an outlet port 48b for detection through which a gas, which has been blown to the protective portion 44b for detection, is discharged. The outlet port 48a for laser beam projection passes the laser beam L1, which is to be projected on the work pieces W, as well as a gas, and the outlet port 48b for detection passes the detection laser beam L2, which has been reflected from the work pieces, as well as a gas. Accordingly, since gases having flowed out through the slits 47b can be discharged from the outlet port 48a for laser beam projection and the outlet port 48b for detection, which pass the laser beams L1 and L2, respectively, at a stable pressure by the accumulator 47a, variations in the measurement accuracy of the sensor unit 2 can be suppressed.

Figure 11A:
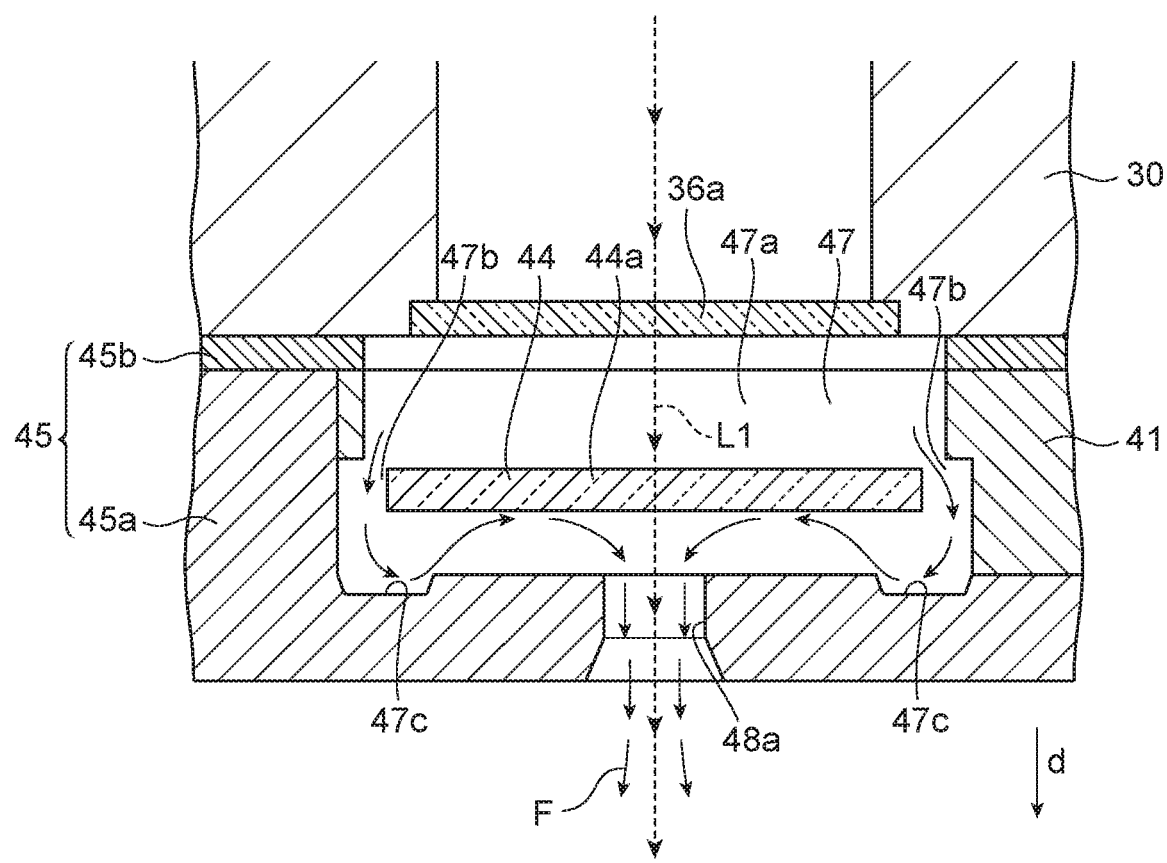
FIG. 11A is a cross-sectional view in the direction of the arrows along line C-C of FIG. 8.
Figure 11B:
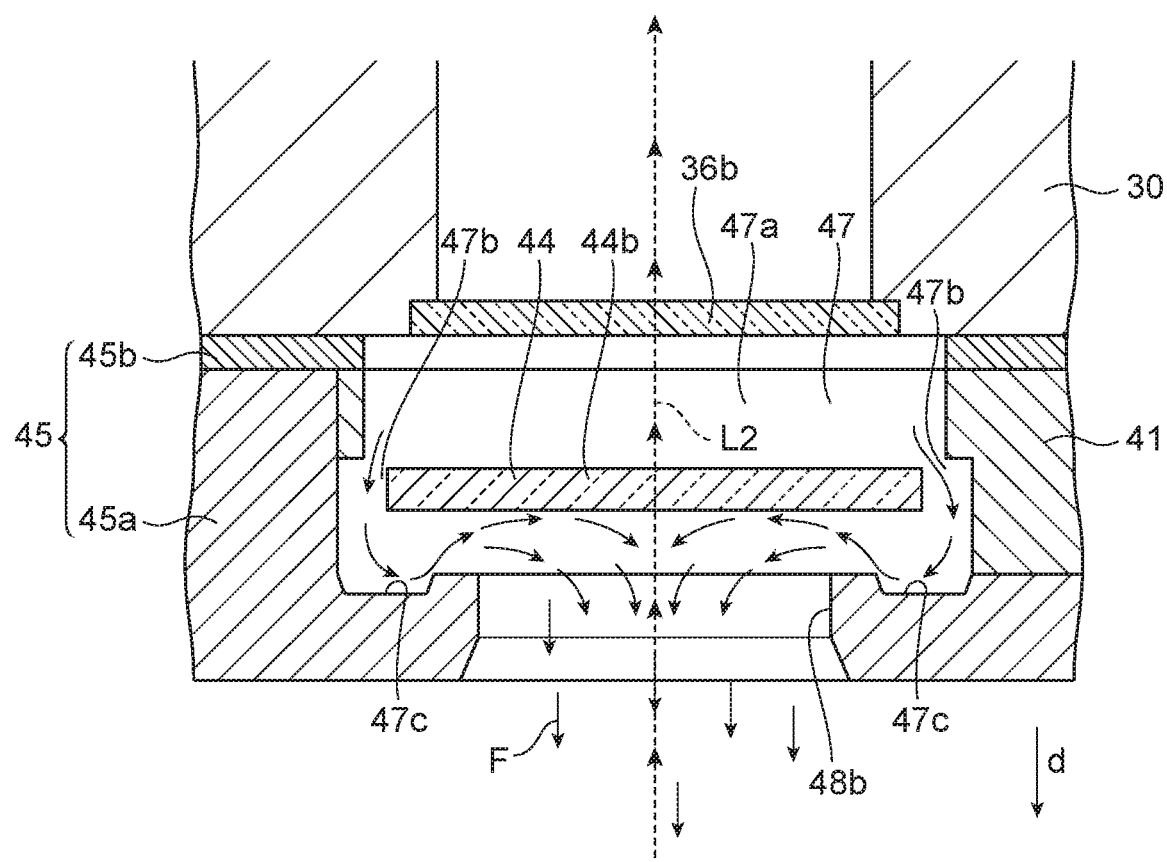
FIG. 11B is a cross-sectional view in the direction of the arrows along line D-D of FIG. 8.

As illustrated in FIGS. 11A and 11B, in the present embodiment, as a more preferable configuration, the second gas flow channel 47 is formed such that gases having flowed out through the slits 47b flow toward the protective plate 44 from the side on which the laser beam L1 is projected (i.e., on the side of the work pieces W). Accordingly, gases having flowed out through the slits 47b can be blown to the protective plate 44 at a stable pressure by the accumulator 47a. Consequently, sticking of foreign matter, such as dust, to the protective plate 44 can be suppressed stably.

In the present embodiment, as a further preferable configuration, as illustrated in FIGS. 11A and 11B, a guide groove 47c, which guides a flow of a gas F, is formed on the downstream side of each slit 47b. The guide groove 47c is a groove formed so as to allow the gas F, which has flowed to a portion around the protective plate 44 on the side of the outlet port 48a for laser beam projection or the side of the outlet port 48b for detection, to the protective portion 44a for laser beam detection or the outlet port 48b for detection. Specifically, the guide groove 47c is formed in a portion of the holder body 45a of the holder 45 (or on the wall face of the second gas flow channel 47) so as to face each slit 47b.

In this manner, as illustrated in FIGS. 11A and 11B, gases having passed through the slits 47b are guided by the guide grooves 47c. The guided gases can be blown from the portions around the protective plate 44 on the side on which the laser beam is projected (i.e., the side of the work pieces W) to the protective portion 44a for laser beam detection and the protective portion 44b for detection of the protective plate 44. Further, the gases F blown to the protective portion 44a for laser beam detection or the protective portion 44b for detection of the protective plate 44 from opposite sides thereof flow in the directions to face each other. The gases F flowing in the directions to face each other mutually collide with each other while colliding with the surface of the protective portion 44a for laser beam projection of the protective plate 44 so that the flow velocities of the gases are reduced and the resulting merged gas F can be discharged from the outlet port 48a for laser beam projection. Consequently, as the gases F have the reduced flow velocities, the gases F become less likely to flow toward the side where the work pieces W are to be welded together (that is, toward the welding torch 91), Thus, stable welding can be performed.

In addition, in the present embodiment, the cross-section of the flow channel of the outlet port 48b for detection through which the gas F flows is larger than that of the outlet port 48a for laser beam projection through which the gas F flows. Therefore, the flow rate of the gas F that flows through the outlet port 48b for detection is higher than that of the gas F that flows through the outlet port 48a for laser beam projection. Further, the outlet port 48b for detection is formed closer to the shielding member 5 than is the outlet port 48a for laser beam projection (see FIG. 11). Consequently, a larger amount of gas F from the outlet port 48b for detection can be blown to the shielding member 5, and thus, the shielding member 5 can be efficiently cooled from its rear face 51b side.

5. Regarding Shielding Member 5

As illustrated in FIG. 1, the sensor device 1 may further include the shielding member 5 in the container 3A. The shielding member 5 shields, among radiation heat generated while the work pieces W are welded together, radiation heat directed toward the lower surface of the housing case 3 (specifically, on a side where the pass-through portion 36a for laser beam projection and the pass-through portion 36b for detection are formed). The shielding member 5 shields sputter S scattered from the molten pool P toward the lower surface of the housing case 3.

Herein, the shielding member 5 is preferably made of a material with lower thermal conductivity than that of the material of the housing case 3. In the present embodiment, when each of the case body 30 and the protective cover 40 is made of a metallic material, the shielding member 5 is preferably made of a non-metallic material, such as a resin material or a ceramic material, with lower thermal conductivity than that of the metallic material. Since the material of the shielding member 5 is made of a material with lower thermal conductivity than that of the material of the housing case 3, transfer of heat from the shielding member 5 to the housing case 3 can be reduced. Therefore, as the sensor unit 2 within the housing case 3 is unlikely to be influenced by radiation heat, the detection accuracy of the sensor unit 2 can be secured.

Figure 12:
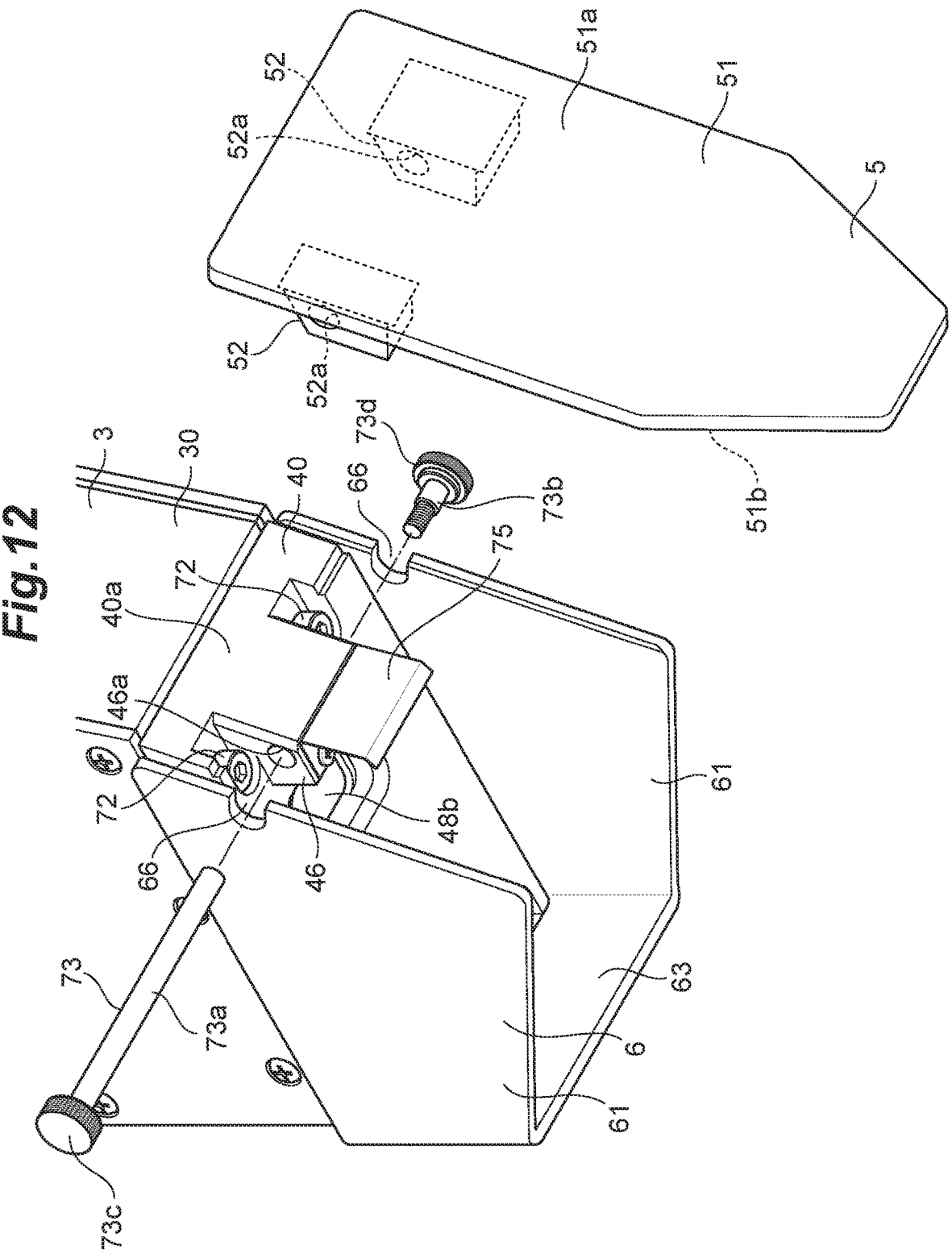
FIG. 12 is an exploded perspective view of a shielding member of the sensor device for welding illustrated in FIG. 1.

As illustrated in FIG. 12, the shielding member 5 has formed therein a plate-like portion 51, which shields radiation heat generated during welding, and two first attachment portions 52 and 52 for attaching the shielding member 5 to the housing case 3. Each first attachment portion 52 is formed on the rear face 51b of the plate-like portion 51 on the side opposite to the front face 51a side where the work pieces W are to be welded together.

The protective cover 40 (specifically, the holder 45) of the housing case 3 has formed thereon a second attachment portion 46 for attaching the shielding member 5 to the protective cover 40 on the rear face 51b side of the plate-like portion 51. In a state in which the shielding member 5 is attached to the protective cover 40, the second attachment portion 46 is arranged between the two first attachment portions 52 and 52 of the shielding member 5.

Each first attachment portion 52 of the shielding member 5 and the second attachment portion 46 of the protective cover 40 have formed therein through-holes 52a and 46a, respectively, for passing an attachment shaft 73 along the direction in which the plate-like portion 51 of the shielding member 5 extends (specifically, the lateral direction of the sensor device 1). The shaft 73 is made of a metallic material or a ceramic material, for example.

The shielding member 5 is attached to the protective cover 40 of the housing case 3 as the shaft 73 is inserted through the through-holes 52a of the pair of first attachment portions 52 and the through-hole 46a of the second attachment portion 46 formed between them. The shaft 73 includes a shaft body 73a and a screw body 73b screwably attached thereto. After the shaft body 73a is inserted through the through-holes 52a and 46a from a lateral face side of the housing case, 3 (or the protective cover 40), the screw body 73b is screwed into the shaft body 73a so that the shielding member 5 can be attached to the protective cover 40. The guide member 6 described below can be sandwiched between the shaft body 73a and heads 73c and 73d of the screw body 73b from the opposite sides thereof.

In the housing case 3, an elastic member 75 made of metal, which urges the shielding member 5 toward the side where the work pieces W are to be welded together, is attached to the second attachment portion 46 of the protective cover 40 in a state in which the shielding member 5 is attached to the housing case 3 (or the protective cover 40 thereof). In the present embodiment, in a state in which the shielding member 5 is urged by the elastic member 75, a gap is formed between the housing case 3 (or the protective cover 40 thereof) and the plate-like portion 51 of the shielding member 5 and a gap is also formed between the guide member 6 and the plate-like portion 51 of the shielding member 5 (see FIG. 2). Due to such gaps, heat becomes less easily transferred to the housing case 3 from the shielding member 5. In addition, since the shielding member 5 is elastically urged by the elastic member 75 in a state in which such gaps are formed, the elastic member 75 functions as a shock absorbing member. Therefore, damage to the shielding member 5 can be suppressed.

Herein, as a more preferable configuration, an end 51c, which is on the side away from the work pieces W, of the plate-like portion 51 is in contact with the front face 40a of the protective cover 40 while the gap is formed between the plate-like portion 51 of the shielding member 5 and the protective cover 40 in a state in which the shielding member 5 is attached to the protective cover 40 of the housing case 3 (see FIG. 12). Therefore, the shielding member 5 can be stably attached to the protective cover 40, and heat becomes less likely to be transferred to the protective cover 40 from the shielding member 5.

Further, as described above, the second gas flow channel 47 has formed therein a plurality of fins 47m extending in one direction. Accordingly, heat transferred to the protective cover 40 from the shielding member 5 is radiated by the plurality of fins 47m formed in the second gas flow channel 47. In particular, in the present embodiment, as a more preferable configuration, the second gas flow channel 47 is formed such that a gas flows from the front face 40a side to the rear face 40b side of the protective cover 40. Therefore, the front face 40a of the protective cover 40 can efficiently radiate heat from the end 51c of the plate-like portion 51 in contact with the front face 40a. Further, since the fins 47m formed in the second gas flow channel 47 also extend from the front face 40a side at which the temperature is higher during welding of the protective cover 40 to the rear face 40b side at which the temperature is lower, heat transferred to the fins 47m can be radiated more efficiently.

In the present embodiment, the shielding member 5 is inclined with respect to the flow direction d of the gas that passes through the outlet port 48b for detection so that the gas discharged from the outlet port 48b for detection is blown to the shielding member 5 and thus flows to the side opposite to the side where the work pieces W are to be welded together. The gas moving straight along the flow direction d from the outlet port 48b for detection collides with the rear face 51b of the plate-like portion 51 of the inclined shielding member 5. Accordingly, since the gas discharged from the outlet port 48b for detection is blown to the shielding member 5, the shielding member 5 can be cooled with the gas. Further, since the gas blown to the shielding member 5 flows to the side opposite to the side where the work pieces W are to be welded together, the gas becomes less likely to flow to the side where the work pieces W are to be welded together. Accordingly, the influence of the gas (or a flow thereof) discharged from the outlet port 48b for detection can be reduced in the portion where the work pieces are to be welded together, and thus, stable welding can be performed.

6. Regarding Guide Member 6

The sensor device 1 may further include the guide member 6. The guide member 6 extends to the side on which the laser beam L1 is projected (downward in the drawing) so as to surround the protective cover 40 together with the shielding member 5 (see FIGS. 2 and 3). That is, the guide member 6 and the shielding member 5 form a nozzle that guides the gases discharged from the outlet ports (i.e., the outlet port 48a for laser beam projection and the outlet port 48b for detection) toward the side of the work pieces W on which the laser beam L1 is projected. The guide member 6 is made of a metallic material or a ceramic material. In the present embodiment, the guide member 6 is made of brass, for example. The guide member 6 made of brass can reflect infrared rays generated during welding.

Figure 13:
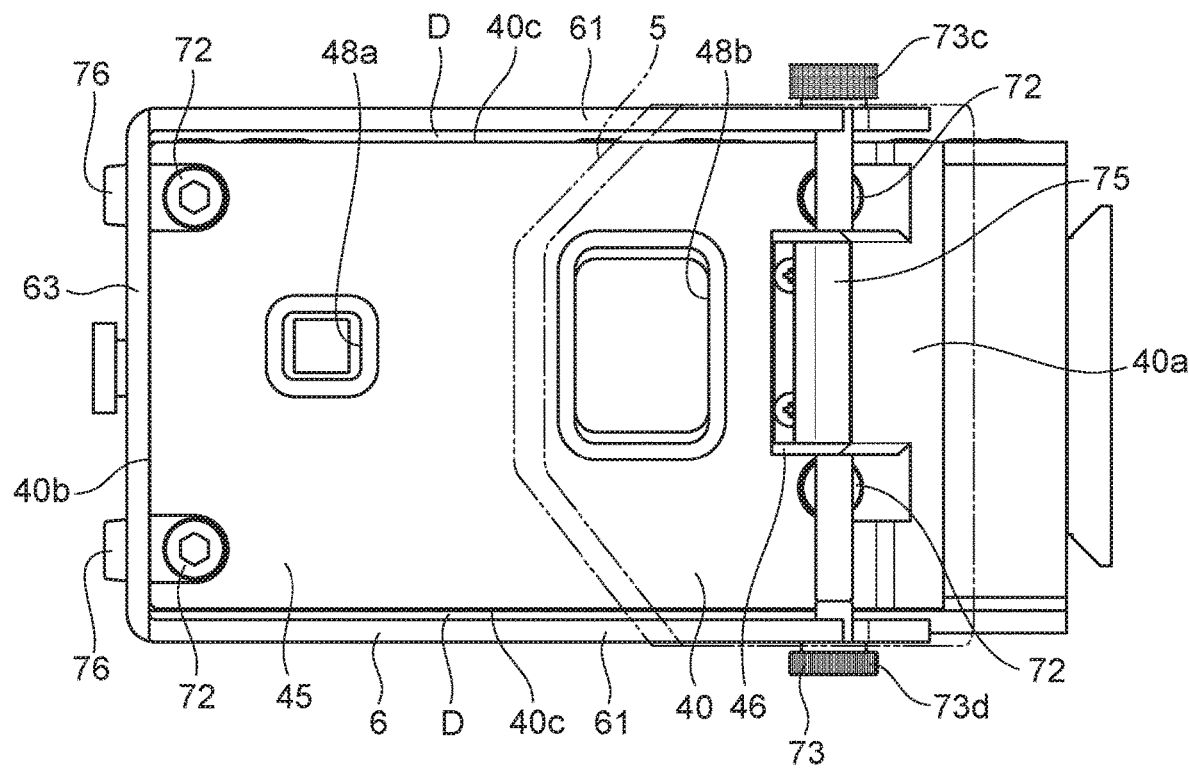
FIG. 13 is a bottom view of the sensor device for welding illustrated in FIG. 9 with the shielding member removed.

Further, in the present embodiment, as illustrated in FIG. 13, the guide member 6 is formed so as to surround the pair of lateral side faces 40c and 40c and the rear side face 40b of the protective cover 40, and a gap D is formed between the guide member 6 and each lateral side face 40c. More specifically, the guide member 6 includes a lateral plate portion 61 that is formed at a position facing each lateral side face 40c, and a rear plate portion 63 that is formed continuously with the lateral plate portion 61 at a position facing the rear side face 40b. The aforementioned gap D is formed between the lateral side face 40c of the protective cover 40 and the lateral plate portion 61 of the guide member 6 that faces the lateral side face 40c. The rear plate portion 63 has formed therein a cutout 63a through which the cartridge 41 of the protective cover 40 is pulled out (see FIG. 3).

As described above, in the present embodiment, transfer of the radiation heat H, which is generated during welding and directed toward the protective cover 40 from the guide member 6, can be blocked by the gap D formed between the lateral side face 40c of the protective cover 40 and the lateral plate portion 61 of the guide member 6 that faces the lateral side face 40c (see FIG. 1). Further, due to the flows of the gases F discharged from the outlet port 48a for laser beam projection and the outlet port 48b for detection, a region around the gap D is at a negative pressure. Accordingly, a gas (i.e., atmosphere) is sucked into the space surrounded by the guide member 6 and the shielding member 5 from a region near the side face of the case body 30 via the gap D formed between each lateral plate portion 61 of the guide member 6 and each lateral side face 40c of the protective cover 40. Due to the flow of the sucked gas, flows of the gases, which have been discharged from the outlet port 48a for laser beam projection and the outlet port 48b for detection, toward the outer side of the lateral side faces 40c of the protective cover 40 can be suppressed.

As a further preferable embodiment, in the present embodiment, a rim 61a of the lateral plate portion 61 on the side where the work pieces W are to be welded together is inclined to become closer to the protective cover 40 in the direction toward the rear plate portion 63 from the side of the shielding member 5 (see FIGS. 2 and 3). This allows the discharged gases to more easily flow to the side (i.e., rear side) opposite to the side where the work pieces W are to be welded together.

Further, as illustrated in FIG. 12, the guide member 6 has formed therein slit portions 66 into which the shaft 73 is adapted to enter, and the shaft 73 is housed within the slit portions 66 formed in the guide member 6. When the guide member 6 is detached, the two attachments 76 and 76 are removed first so as to loosen the shaft body 73a and the screw body 73b fastened together. Next, pulling out the guide member 6 backward allows the shaft 73 to be pulled out of the slit portions 66 and thus allows the guide member 6 to be easily detached from the sensor device 1. Accordingly, the protective cover 40 can be inspected in a state in which the shielding member 5 is attached to the protective cover 40 and in a state in which the guide member 6 is detached from the protective cover 40.

Although the embodiments of the present invention have been described in detail above, the present invention is not limited to thereto, and various design changes can be made without departing from the spirit or scope of the invention recited in the claims.

In the present embodiment, the sensor unit projects a laser beam onto work pieces and receives a laser beam reflected from the work pieces as a detection light beam so as to measure the states (i.e., shapes) of the work pieces and the distance from the detection unit to the work pieces. However, for example, the sensor unit may image a light beam reflected from the work pieces or a light beam emitted from the work pieces during welding as a detection light beam using an imaging device (i.e., camera) so as to detect the welded states of the work pieces, for example.

What is claimed is:

1. A sensor device for welding, comprising:
   a sensor configured to detect as a detection light beam a light beam from surfaces of work pieces to be welded together, the sensor being configured to measure states of the work pieces or a distance to the work pieces using the detection light beam detected with the sensor;
a case body adapted to house the sensor, the case body having formed therein at least one pass-through portion that passes the detection light beam directed toward the sensor; and
a protective cover including a protective plate that transmits the detection light beam, the protective cover being attached to the case body such that the protective plate covers the pass-through portion,
wherein:
the protective cover has formed therein a gas flow channel that passes a gas to be blown to the protective plate, the gas flow channel having formed therein an outlet port that passes the detection light beam and discharges the gas having flowed through the gas flow channel,
the gas flow channel has formed therein an accumulator between the protective cover and the case body, the accumulator being adapted to have accumulated therein the gas flowing through the gas flow channel, the accumulator including a first accumulator and a second accumulator,
the second accumulator has formed therein vent holes through which the gas is allowed to flow out toward the outlet port,
the protective cover includes the protective plate and a holding member, the holding member being adapted to hold the protective plate,
the gas flow channel has formed therein an introduction flow channel through which the gas is introduced into the first accumulator,
the first accumulator is between the holding member and the case body, and the second accumulator is between the protective plate and the case body,
the first accumulator is configured to have introduced thereinto the gas from the introduction flow channel and to flow the gas to the second accumulator before the gas flows through the vent holes,
the second accumulator is configured to allow the gas having flowed thereinto from the first accumulator to flow out through the vent holes, and
a throttle portion is formed between the first accumulator and the second accumulator, the throttle portion being configured to throttle a flow rate of the gas to flow into the second accumulator from the first accumulator.

2. The sensor device for welding according to claim 1, wherein:
the protective cover includes the protective plate and a holding member, the holding member being adapted to hold the protective plate, and
the vent holes are formed on opposite sides of the second accumulator, between the protective plate and the holding member.

3. The sensor device for welding according to claim 1, wherein the vent holes are slits.

4. The sensor device for welding according to claim 3, wherein a wall face of the gas flow channel on the side of the work pieces that faces the slits has formed therein guide grooves, the guide grooves being adapted to guide the gas having flowed out through the slits toward the protective plate.

5. The sensor device for welding according to claim 1, wherein the first accumulator has formed therein a pair of spaces extending along the introduction flow channel on opposite sides of the introduction flow channel.

6. The sensor device for welding according to claim 5, wherein each space formed in the first accumulator has formed therein at least one partition wall that partitions the space along the introduction flow channel.

7. The sensor device for welding according to claim 1, wherein:
the vent holes are formed on opposite sides of the protective plate, between the protective plate and the holding member, and
the introduction flow channel is formed such that the gas is introduced toward a center between the vent holes formed on the opposite sides of the protective plate.

8. The sensor device for welding according to claim 1, wherein:
the case body has formed therein a first gas flow channel that passes the gas for cooling the sensor,
the gas flow channel that passes the gas to be blown to the protective plate is a second gas flow channel that communicates with the first gas flow channel and passes the gas such that the gas is discharged from around the protective plate, and
the case body has formed therein a gas supply port and a gas discharge port, the gas supply port being adapted to supply the gas to the first gas flow channel, and the gas discharge port being adapted to discharge the gas supplied to the first gas flow channel to an outside of the sensor device for welding from the case body.

9. The sensor device for welding according to claim 8, wherein:
the first gas flow channel is connected to the gas supply port and the gas discharge port, and
the second gas flow channel communicates with the first gas flow channel such that the second gas flow channel branches off the first gas flow channel.

10. The sensor device for welding according to claim 8, wherein provided that a surface of the case body on a side where the work pieces are to be welded together with respect to the sensor device for welding is a front face of the case body, and a surface opposite to the front face is a rear face of the case body, the gas supply port is formed on the front face side of the case body, and the gas discharge port is formed on the rear face side of the case body.

11. The sensor device for welding according to claim 8, wherein:
the case body includes a chassis and a cover, the chassis being adapted to house the sensor and having formed therein the pass-through portion, and the cover being adapted to cover an outer wall face of the chassis,
at least one of the outer wall face of the chassis or a surface of the cover that faces the outer wall face has formed therein a groove portion with a serpentine shape corresponding to a shape of the first gas flow channel, and
the outer wall face of the chassis is covered with the cover so that at least a part of the first gas flow channel is formed.

12. The sensor device for welding according to claim 8, wherein a portion where the first gas flow channel communicates with the second gas flow channel has arranged therein a throttle member, the throttle member being adapted to throttle a flow rate of the gas to flow into the second gas flow channel.

13. The sensor device for welding according to claim 8, wherein provided that a surface of the protective cover on a side where the work pieces are to be welded together with respect to the sensor device for welding is a front face of the protective cover, and a surface opposite to the front face is a rear face of the protective cover, the second gas flow channel is formed such that the gas flows from the front face side to the rear face side of the protective cover.

14. The sensor device for welding according to claim 13, wherein the second gas flow channel has formed therein a cooling flow channel extending along the front face of the protective cover.

\* \* \* \* \*